United States Patent
Komaba et al.

(10) Patent No.: US 10,674,217 B2
(45) Date of Patent: Jun. 2, 2020

(54) SYSTEMS, METHODS, AND DEVICES FOR REPRODUCTION AND PLAYBACK OF MAINTENANCE GUIDANCE

(71) Applicant: Konica Minolta, Inc., Tokyo (JP)

(72) Inventors: Kenichi Komaba, Toyokawa (JP); Atsushi Tomita, Toyohashi (JP); Hiroshi Sugiura, Toyokawa (JP); Hiroaki Sugimoto, Nagoya (JP); Tatsunori Okada, Toyokawa (JP); Akito Ota, Toyokawa (JP); Yu Sonoda, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 35 days.

(21) Appl. No.: 15/727,151

(22) Filed: Oct. 6, 2017

(65) Prior Publication Data
US 2018/0103297 A1    Apr. 12, 2018

(30) Foreign Application Priority Data

Oct. 12, 2016 (JP) ................. 2016-201011

(51) Int. Cl.
*H04N 1/00* (2006.01)
*H04N 1/32* (2006.01)
*H04N 21/472* (2011.01)
*H04N 9/12* (2006.01)

(52) U.S. Cl.
CPC ... *H04N 21/47217* (2013.01); *H04N 1/00244* (2013.01); *H04N 1/00408* (2013.01);
(Continued)

(58) Field of Classification Search
CPC ........... G05B 2219/32226; G05B 2219/32234; G05B 2219/14112; G05B 2219/23373; G05B 2219/24019; G03G 21/1638; G03G 2215/00548; G03G 2221/1675; G03G 15/2035; H04N 1/00543; H04N 1/00538; H04N 1/00; H04N 1/00076;
(Continued)

(56) References Cited

U.S. PATENT DOCUMENTS

| | | | |
|---|---|---|---|
| 6,750,878 B1* | 6/2004 | Tatsuo | H04N 1/00482 399/81 |
| 9,307,105 B2* | 4/2016 | Ikeda | H04N 1/00411 |
| 2007/0237537 A1* | 10/2007 | Hasegawa | G03G 15/55 399/81 |
| 2009/0141035 A1* | 6/2009 | Kodama | H04N 1/00408 345/530 |

(Continued)

FOREIGN PATENT DOCUMENTS

| JP | 2013-135404 A | 7/2013 |
|---|---|---|
| JP | 2014-203001 A | 10/2014 |
| JP | 2015-082706 A | 4/2015 |
| JP | 2015-106288 A | 6/2015 |

*Primary Examiner* — Juan M Guillermety
(74) *Attorney, Agent, or Firm* — BakerHostetler

(57) ABSTRACT

A device for reproducing guidance on a task including a plurality of steps is provided. The device includes an input device with which a user selects from which position of the guidance is to be reproduced; and a player configured to, where a designated step corresponding to the position selected by the user from among the steps is a particular step, jump a playback progress to the position selected to play the guidance, the particular step being an initial step of steps having not yet been performed completely, and, where the designated step is not the particular step, jump the playback progress to a position of the particular step to play the guidance.

21 Claims, 20 Drawing Sheets

(52) U.S. Cl.
CPC .......... *H04N 1/32657* (2013.01); *H04N 9/12* (2013.01); *H04N 2201/0039* (2013.01); *H04N 2201/0094* (2013.01)

(58) Field of Classification Search
CPC .......... H04N 1/00037; H04N 1/00079; H04N 1/00084; H04N 1/32776; H04N 1/33346; H04N 1/00204; H04N 1/4433; H04N 2201/0055; H04N 2201/0041; H04Q 9/00; H04M 1/00; G06F 3/0484; G06F 3/12; G06F 3/1217; G06F 3/1218; G06F 3/1219; G06F 3/121; G06F 3/1256; G06F 3/1292; G06F 3/1235; G06F 3/1204; B41J 29/42; B41J 29/38; H04L 9/3073
See application file for complete search history.

(56) References Cited

U.S. PATENT DOCUMENTS

| | | | |
|---|---|---|---|
| 2009/0284587 A1* | 11/2009 | Berg | B41F 33/02 348/61 |
| 2013/0163955 A1* | 6/2013 | Yamamoto | H04N 1/00408 386/239 |
| 2015/0104211 A1* | 4/2015 | Sato | G03G 15/502 399/81 |
| 2015/0109637 A1* | 4/2015 | Ikeda | H04N 1/00506 358/1.15 |
| 2015/0154877 A1* | 6/2015 | Ikeda | G09B 5/02 434/379 |
| 2015/0170711 A1* | 6/2015 | Ohtsubo | H04N 9/8205 386/241 |

* cited by examiner

| MAINTENANCE | CLEAR PAPER JAM IN FIXING UNIT | CLEAR JAM OF PRINTED MATTER | REPLACE TONER | ... |
|---|---|---|---|---|
| CORRESPONDING ERROR | PAPER JAM IN FIXING UNIT | JAM OF PRINTED MATTER | OUT OF TONER | ... |
| STEPS 1 | RIGHT DOOR SENSOR BEFORE: RIGHT DOOR CLOSED AFTER: RIGHT DOOR OPEN | RIGHT DOOR SENSOR BEFORE: RIGHT DOOR CLOSED AFTER: RIGHT DOOR OPEN | UPPER FRONT DOOR SENSOR BEFORE: UPPER FRONT DOOR CLOSED AFTER: UPPER FRONT DOOR OPEN | ... |
| 2 | LEVER SENSOR BEFORE: LEVER IN UP POSITION AFTER: LEVER IN DOWN POSITION | INNER DOOR SENSOR BEFORE: INNER DOOR CLOSED AFTER: INNER DOOR OPEN | TRAY SENSOR BEFORE: TRAY IN AFTER: TRAY OUT | ... |
| 3 | FIRST PAPER PATH SENSOR BEFORE: PAPER PRESENT AFTER: NO PAPER PRESENT | SECOND PAPER PATH SENSOR BEFORE: PAPER PRESENT AFTER: NO PAPER PRESENT | TONER SENSOR BEFORE: TONER IN AFTER: TONER OUT | ... |
| 4 | LEVER SENSOR BEFORE: LEVER IN DOWN POSITION AFTER: LEVER IN UP POSITION | INNER DOOR SENSOR BEFORE: INNER DOOR OPEN AFTER: INNER DOOR CLOSED | TONER SENSOR BEFORE: TONER OUT AFTER: TONER IN | ... |
| 5 | RIGHT DOOR SENSOR BEFORE: RIGHT DOOR OPEN AFTER: RIGHT DOOR CLOSED | RIGHT DOOR SENSOR BEFORE: RIGHT DOOR OPEN AFTER: RIGHT DOOR CLOSED | TRAY SENSOR BEFORE: TRAY OUT AFTER: TRAY IN | ... |
| 6 | — | — | UPPER FRONT DOOR SENSOR BEFORE: UPPER FRONT DOOR OPEN AFTER: UPPER FRONT DOOR CLOSED | ... |

| MAINTENANCE | STEPS | | | | | | |
|---|---|---|---|---|---|---|---|
| | 1 | 2 | 3 | 4 | 5 | 6 | |
| CLEAR PAPER JAM IN FIXING UNIT | ○ | ○ | ○ | ○ | ○ | ○ | 6C1 (6C) |
| CLEAR JAM OF PRINTED MATTER | ○ | ○ | ○ | ○ | ○ | — | 6C2 (6C) |
| REPLACE TONER | ○ | ○ | ○ | ○ | ○ | — | 6C3 (6C) |
| ... | ... | ... | ... | ... | ... | ... | |

| MAINTENANCE | STEPS | | | | | |
|---|---|---|---|---|---|---|
| | 1 | 2 | 3 | 4 | 5 | 6 |
| CLEAR PAPER JAM IN FIXING UNIT | 1 | 1 | 0 | 0 | 0 | — |
| CLEAR JAM OF PRINTED MATTER | 1 | 0 | 0 | 0 | 0 | — |
| REPLACE TONER | 0 | 0 | 0 | 0 | 0 | 0 |
| ... | ... | ... | ... | ... | ... | ... |

SYSTEMS, METHODS, AND DEVICES FOR REPRODUCTION AND PLAYBACK OF MAINTENANCE GUIDANCE

Japanese Patent application No. 2016-201011 filed on Oct. 12, 2016, including description, claims, drawings, and abstract of the entire disclosure is incorporated herein by reference in its entirety.

BACKGROUND

1. Technological Field

The present invention relates to a technology for reproducing maintenance guidance and so on.

2. Description of the Related Art

Recent years have seen the widespread use of image forming apparatuses into which functions such as copying, network printing, faxing, scanning, and file server are integrated. Such an image forming apparatus is called a "multifunction device" or a "Multi-Functional Peripheral (MFP)". Due to the different functions integrated, the image forming apparatus is complex in structure. This requires a user to perform a complicated task to deal with an error or a complicated task for maintenance.

For the purpose of offering guidance on how to deal with such a complicated task to a user for easy understanding, the following technologies have been proposed, for example.

One of the technologies is related to an image forming apparatus which includes: guide information display means for displaying operation guide information stored in operation guide information storage means; equipment state information creation means for acquiring sensor information from sensors arranged at respective places to create equipment state information for specifying the equipment state of the apparatus; state screen specification table on which the equipment state information and the operation guide information displayed in the respective equipment states are associated with each other; and screen information determination means for comparing the equipment state information created by the equipment state information creation means with the equipment state information registered to the state screen specification table to determine the operation guide information to be displayed on the guide information display means. When the equipment state information creation means updates the equipment state information, the screen information determination means switches the operation guide information to be displayed in real time on the guide information display means (English abstract of Japanese Laid-open Patent Publication No. 2014-203001).

The other is related to an image processing apparatus capable of reproducing a video. The image processing apparatus includes a moving means for moving the reproduction position of a video to an arbitrary position according to the user operation, and determines whether the reproduction position after movement is a position rewound from the reproduction position before movement. If a determination is made that the reproduction position after movement is a position rewound from the reproduction position before movement, the image processing apparatus is provided with an operation means for designating control of loop reproduction of a section from the start position to the end position by saving the reproduction position after movement as the start position of a section subjected to loop reproduction, and saving the reproduction position before movement as the end position of a section subjected to loop reproduction (English abstract of Japanese Laid-open Patent Publication No. 2013-135404).

In some cases, a user cannot perform a task as shown in guidance even while he/she watches a moving image for the guidance to perform the task. In such a case, the user sometimes skips a part of the task to move to the next task.

This, however, causes a device failure in some cases. For example, in an image forming apparatus, when a pair of rollers to feed paper or to fix toner onto paper are used, the rollers are pressed onto each other. However, the rollers are separated from each other in order to fix a paper jam.

When a user tries to pull out the jammed paper with the pair of rollers pressed onto each other, the jammed paper is sometimes torn, which makes it difficult to remove the paper, or, the rollers sometimes go out of order unintentionally.

In light of this, it is desirable for the user to jump a playback progress to a position corresponding to the part of the task having not yet been finished and then to watch the guidance. As a method for designating a jump destination, tapping on a progress bar, moving a cursor on the progress bar, or any other methods are known.

However, it is difficult to designate a desired jump destination with the use of the progress bar or the cursor.

SUMMARY

The present invention has been achieved in light of such a problem, and therefore, an object of an embodiment of the present invention is to enable a user to jump a playback progress to a position corresponding to a part of a task having not yet been finished more easily than is conventionally possible.

To achieve at least one of the abovementioned objects, according to an aspect of the present invention, a device reflecting one aspect of the present invention is a device for reproducing guidance on a task including a plurality of steps. The device includes an input device with which a user selects from which position of the guidance is to be reproduced; and a player configured to where a designated step corresponding to the position selected by the user from among the steps is a particular step, jump a playback progress to the position selected to play the guidance, the particular step being an initial step of steps having not yet been performed completely, and where the designated step is not the particular step, jump the playback progress to a position of the particular step to play the guidance.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 5 is a diagram showing an example of state change data.

FIGS. 14A and 14B are diagrams showing examples of state data.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
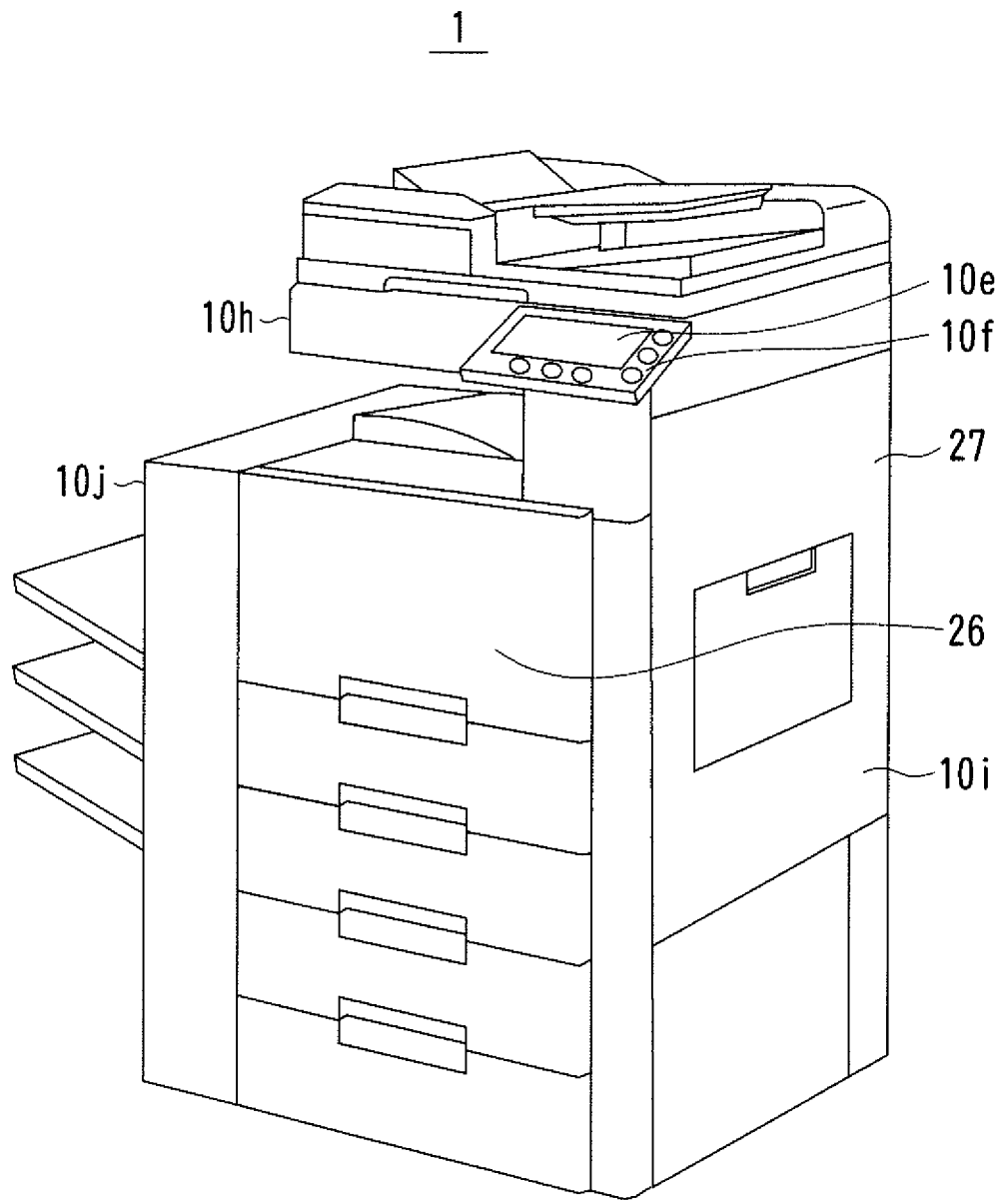
FIG. 1 is a diagram showing an example of the external view of an image forming apparatus.
Figure 2:
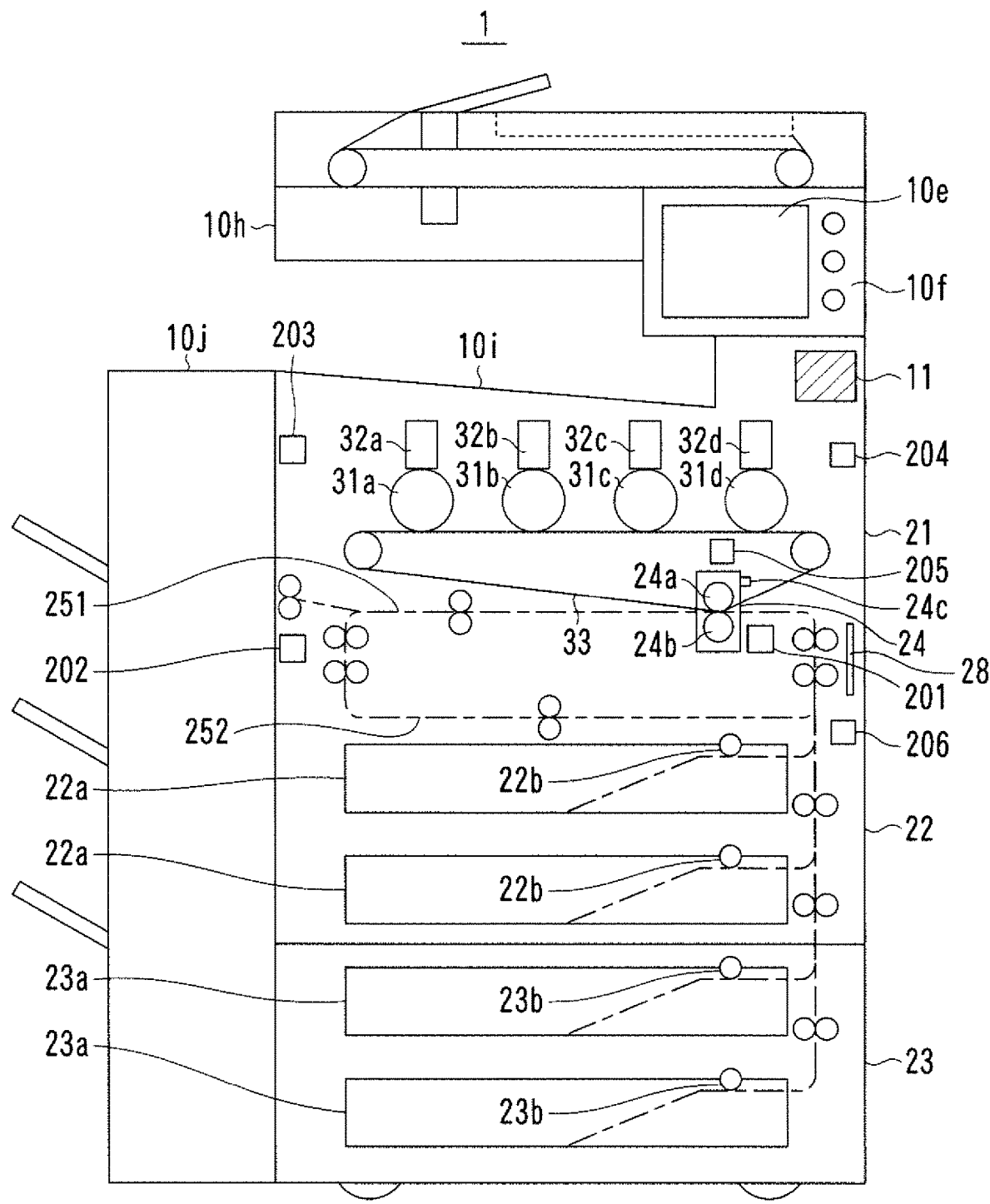
FIG. 2 is a diagram showing an example of the configuration of a printing unit of an image forming apparatus.
Figure 3:
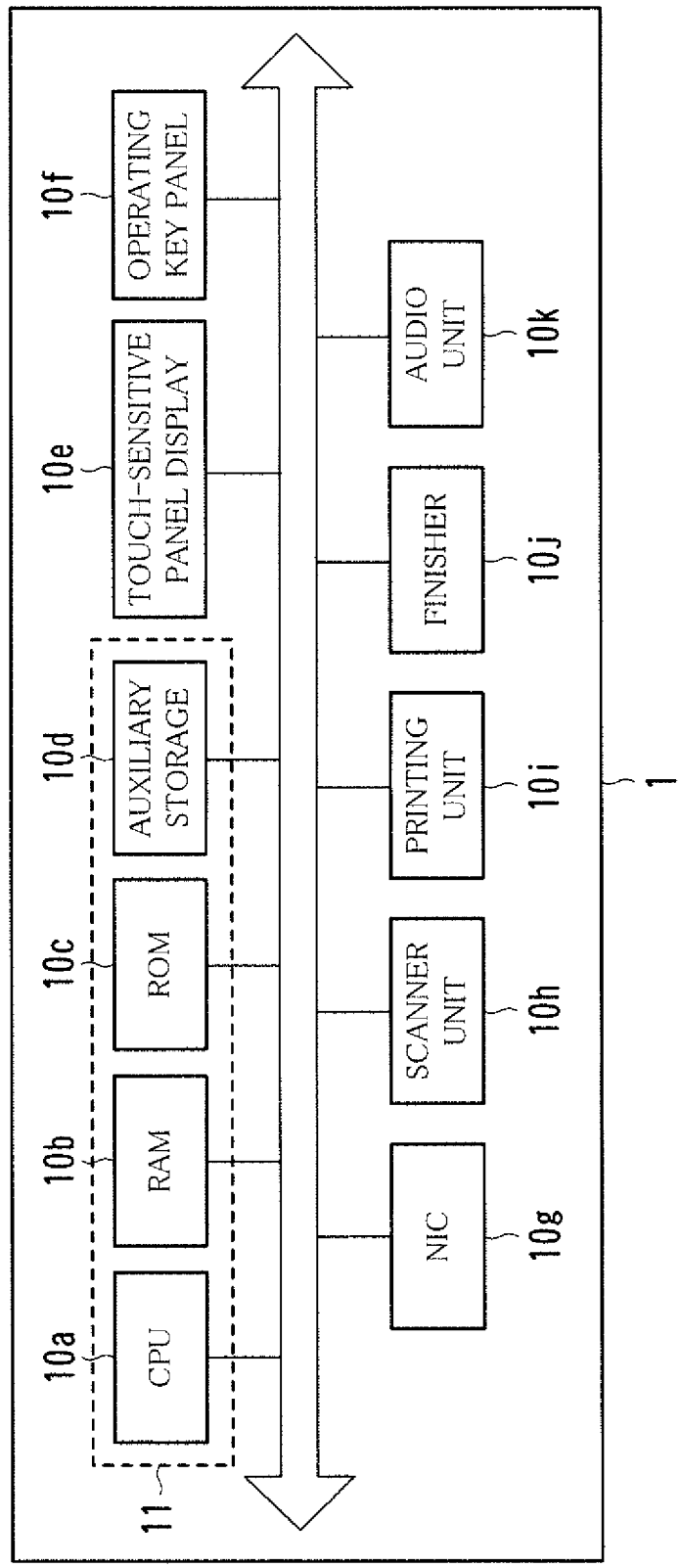
FIG. 3 is a diagram showing an example of the hardware configuration of an image forming apparatus.
Figure 4:
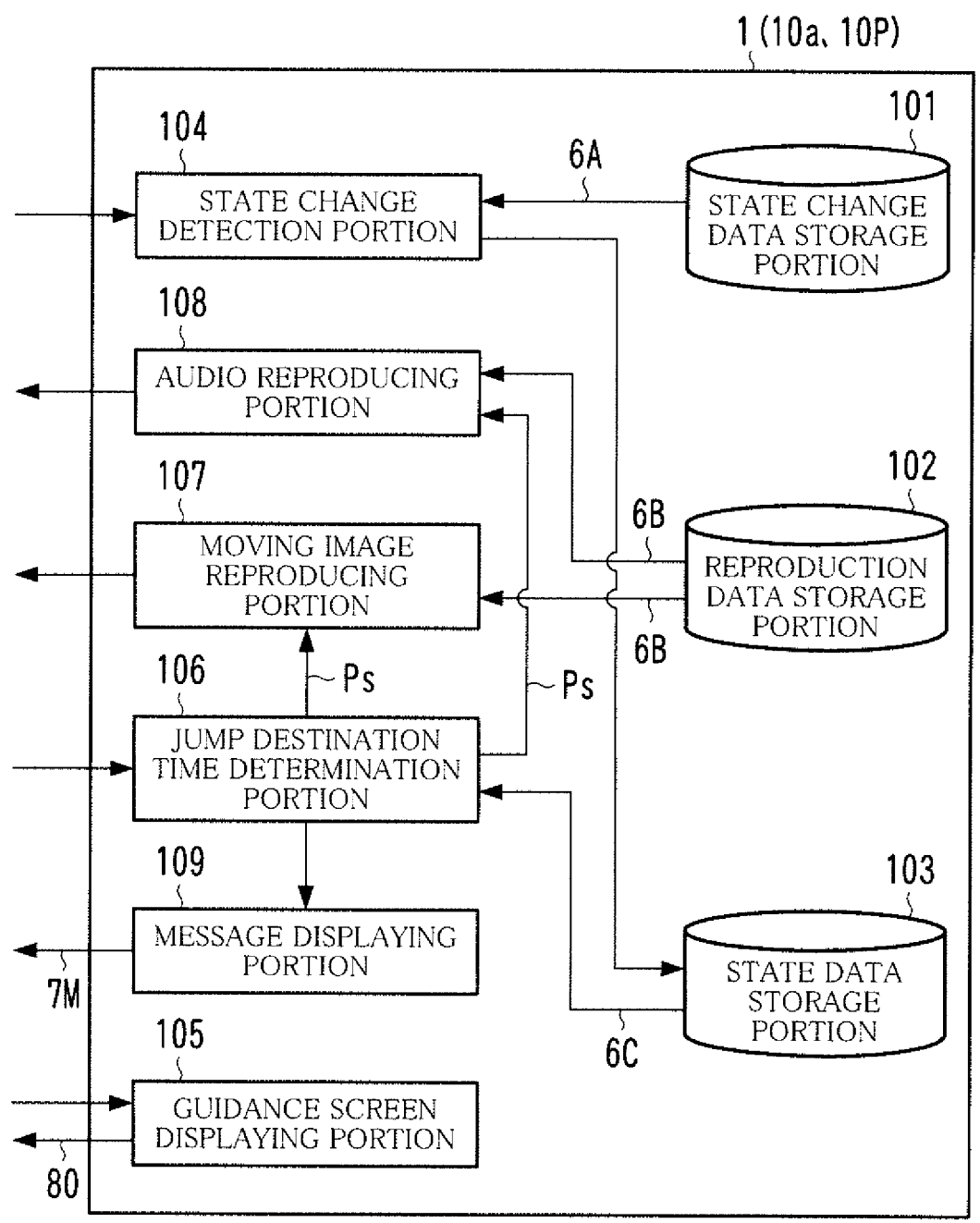
FIG. 4 is a diagram showing an example of the functional configuration of an image forming apparatus.

FIG. 1 is a diagram showing an example of the external view of an image forming apparatus 1. FIG. 2 is a diagram showing an example of the configuration of a printing unit 10i of the image forming apparatus 1. FIG. 3 is a diagram showing an example of the hardware configuration of the image forming apparatus 1. FIG. 4 is a diagram showing an example of the functional configuration of the image forming apparatus 1.

The image forming apparatus 1 shown in FIG. 1 is an apparatus into which functions such as copying, PC printing, cloud printing, faxing, scanning, and box function are incorporated. The image forming apparatus 1 is generally called a "multifunction device" or a "Multi-Functional Peripheral (MFP)". The image forming apparatus 1 is provided in a Local Area Network (LAN).

The PC printing function is to print an image onto paper based on image data received from a terminal provided in the LAN. The PC printing function is sometimes called a "network printing function" or "network printer function".

The cloud printing function is to receive image data from a terminal external to the image forming apparatus 1 through a server on the Internet to print an image onto paper.

According to the box function, each user is given a storage area called a "box" or a "personal box". The box function enables each user to save image data and so on to his/her storage area and to manage the image data and so on therein. Such boxes may be provided on a group-by-group basis and be shared by group members. The box corresponds to a "folder" or a "directory" in a personal computer.

Referring to FIGS. 1-3, the image forming apparatus 1 is configured of a control unit 11, a touch-sensitive panel display 10e, an operating key panel 10f, a Network Interface Card (NIC) 10g, a scanner unit 10h, the printing unit 10i, a finisher 10j, an audio unit 10k, and so on.

The touch-sensitive panel display 10e displays, for example, a screen for presenting messages to the user, a screen for allowing the user to input commands or information, a screen for showing the results of processing executed by the control unit 11. The touch-sensitive panel display 10e also displays a moving image of guidance on how to operate the image forming apparatus 1. The touch-sensitive panel display 10e sends a signal indicating a touched location to the control unit 11.

The operating key panel 10f is a so-called hardware keyboard. The operating key panel 10f has numeric keys, a start key, a stop key, and a function key.

The NIC 10g performs communication with other device in accordance with a protocol such as Transmission Control Protocol/Internet Protocol (TCP/IP).

The scanner unit 10h optically reads an image on a sheet of paper placed on a platen glass to generate image data thereof.

The printing unit 10i includes an image formation section 21, a paper feed section 22, a paper feed cabinet 23, a fixing unit 24, a printed matter path 251, a feedback path 252, an upper front door 26, a right door 27, an inner door 28, a first paper path sensor 201, a second paper path sensor 202, an upper front door sensor 203, a right door sensor 204, a lever sensor 205, and an inner door sensor 206. The configuration enables printing, onto paper, of an image read out by the scanner unit 10h and of an image received by the NIC 10g from other terminal.

The image formation section 21 is a tandem color print engine or a color print engine by electrophotographic steps. The image formation section 21 is provided with photoconductive drums 31a, 31b, 31c, and 31d, exposure scanning units 32a, 32b, 32c, and 32d, a transfer belt 33, and so on.

The photoconductive drums 31a, 31b, 31c, and 31d are photoconductive drums corresponding to yellow, magenta, cyan, and black, respectively. Likewise, the exposure scanning units 32a, 32b, 32c, and 32d are exposure scanning units corresponding to yellow, magenta, cyan, and black, respectively.

The exposure scanning units 32a, 32b, 32c, and 32d perform exposure depending on a print target image based on a signal from the control unit 11 to form latent images on the photoconductive drums 31a, 31b, 31c, and 31d. Then, toner of each color is attached.

The toner images of the individual colors formed on the photoconductive drums 31a, 31b, 31c, and 31d are overlaid on the transfer belt 33. Thereby, a full-color toner image is formed on the transfer belt 33.

The paper feed section 22 is included as standard equipment in the image forming apparatus 1. The paper feed section 22 is a unit for supplying paper to the image formation section 21. The paper feed section 22 is provided with one or more paper feed cassettes 22a, pickup rollers 22b, and so on. Paper sheets are loaded into the paper feed cassettes 22a. The pickup rollers 22b pick up the paper sheets, one by one, from the paper feed cassettes 22a to send out the paper sheet to the image formation section 21.

As with the paper feed section 22, the paper feed cabinet 23 is a unit for supplying paper to the image formation section 21. The paper feed cabinet 23 is mounted on the image forming apparatus 1 as optional equipment. The paper sent out, by pickup rollers 23b, from the paper feed cassettes 23a of the paper feed cabinet 23 is fed through the paper feed section 22 to the image formation section 21.

The fixing unit 24 is provided with two heat rollers 24a and 24b, a lever 24c, and so on. The toner image formed on the transfer belt 33 is transferred by the heat rollers 24a and 24b to the paper sent out from the paper feed section 22 or the paper feed cabinet 23. Moving the lever 24c down separates the heat rollers 24a and 24b from each other. Moving the lever 24c up presses the heat rollers 24a and 24b onto each other.

The printed matter path 251 is a path for a printed matter having the toner image transferred by the fixing unit 24 to be conveyed to the finisher 10j.

The upper front door 26 is provided in the front face of the image forming apparatus 1. A job such as printing is executed with the upper front door 26 closed. Maintenance such as a task for clearing an error or adding consumables is performed with the upper front door 26 opened appropriately.

The right door 27 is provided on the observer's right of the image forming apparatus 1. The inner door 28 is to cover the printed matter path 251 and the feedback path 252. A job such as printing is executed with the right door 27 and the inner door 28 closed. The maintenance is performed with the right door 27 or the inner door 28 opened appropriately.

The first paper path sensor 201 is disposed near the fixing unit 24 to detect the presence/absence of paper at this position. The first paper path sensor 201 also detects a paper jam occurring in the fixing unit 24.

The second paper path sensor 202 is disposed near the printed matter path 25 to detect the presence/absence of a printed matter at this position.

The upper front door sensor 203 is disposed near the upper front door 26 to detect an open/closed state of the upper front door 26. The right door sensor 204 is disposed near the right door 27 to detect an open/closed state of the right door 27.

The lever sensor 205 detects a state of the lever 24c, specifically, detects whether the lever 24c is in the "up" position or the "down" position. The inner door sensor 206 is disposed near the inner door 28 to detect an open/closed state of the inner door 28.

The finisher 10j applies a post-process, if necessary, to the printed matter obtained by the printing unit 10i. The post-process includes stapling the printed matter, punching a hole in the printed matter, and folding the printed matter.

For double-sided printing, paper having an image printed on its one side is switched back near the finisher 10j, and then is fed again to the image formation section 21.

The audio unit 10k is configured of a soundboard, a speaker, and so on to output audio guidance.

The control unit 11 is configured of a Central Processing Unit (CPU) 10a, a Random Access Memory (RAM) 10b, a Read Only Memory (ROM) 10c, an auxiliary storage 10d, and so on.

The ROM 10c or the auxiliary storage 10d stores, therein, a program for implementing the foregoing functions such as copying function. The ROM 10c or the auxiliary storage 10d also stores, therein, a guidance reproducing program 10P (FIG. 4).

The guidance reproducing program 10P is to reproduce a moving image and audio of guidance which gives the user an explanation for maintenance how to clear an error or to add consumables.

The programs are loaded into the RAM 10b as necessary, and are executed by the CPU 10a. The auxiliary storage 10d is, for example, a hard disk drive or a Solid State Drive (SSD).

The guidance reproducing program 10P implements the functions of a state change data storage portion 101, a reproduction data storage portion 102, a state data storage portion 103, a state change detection portion 104, a guidance screen displaying portion 105, a jump destination time determination portion 106, a moving image reproducing portion 107, an audio reproducing portion 108, a message displaying portion 109, and so on, all of which are shown in FIG. 4.

Hereinafter, the individual portions of the state change data storage portion 101 through the message displaying portion 109 are described.

Figure 6:
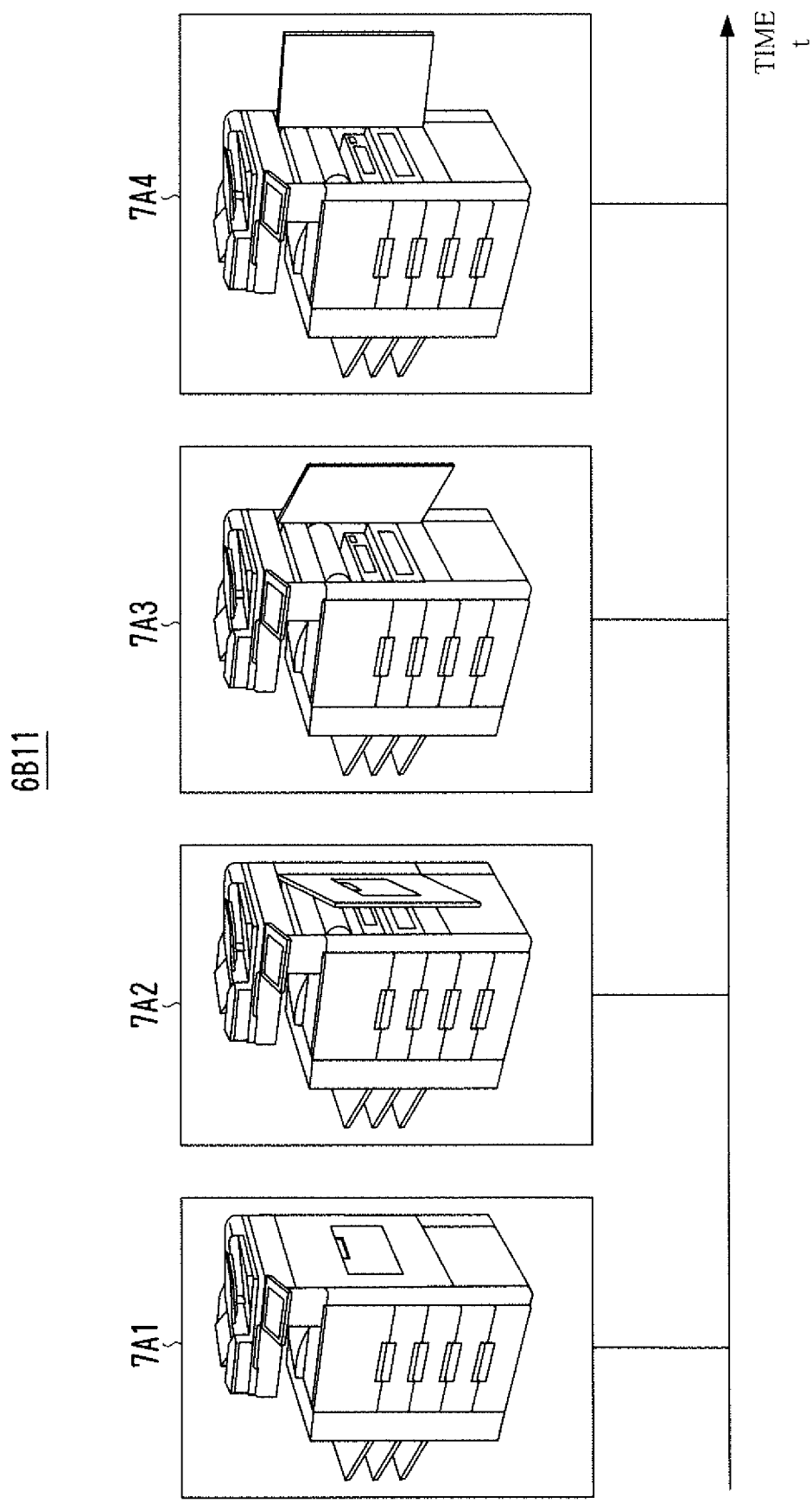
FIG. 6 is a diagram showing an example of images included in a moving image of a chapter.
Figure 7:
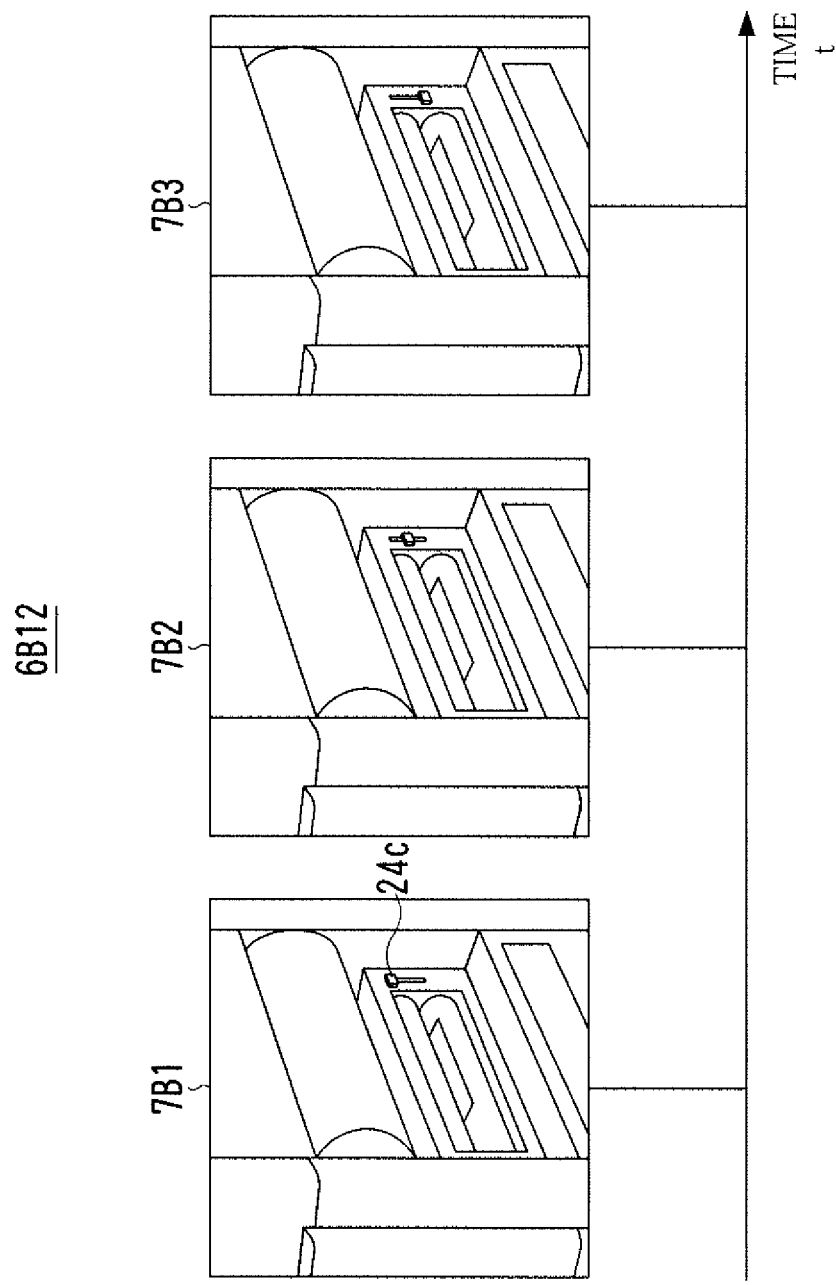
FIG. 7 is a diagram showing an example of images included in a moving image of a chapter.
Figure 8:
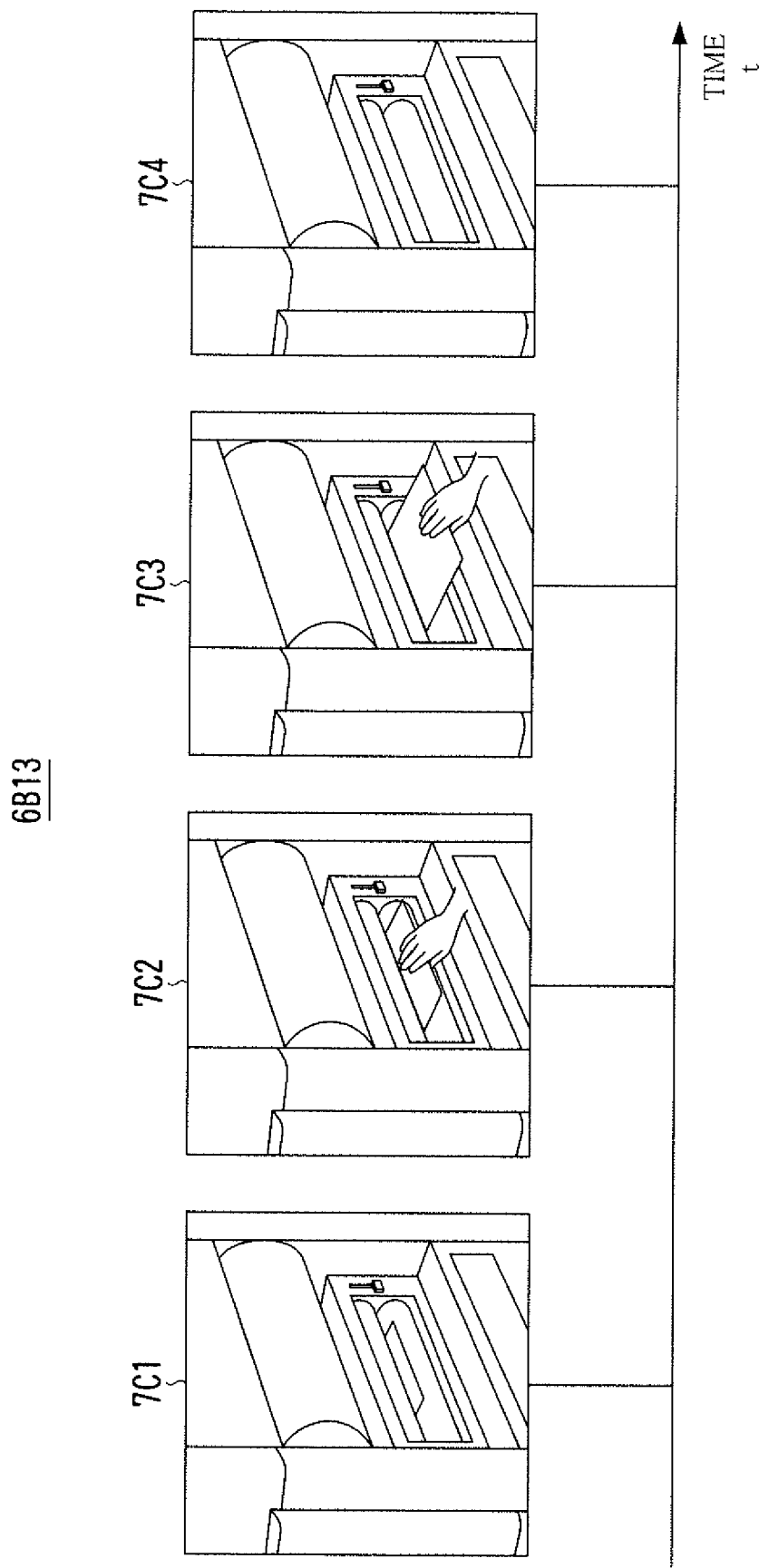
FIG. 8 is a diagram showing an example of images included in a moving image of a chapter.
Figure 9:
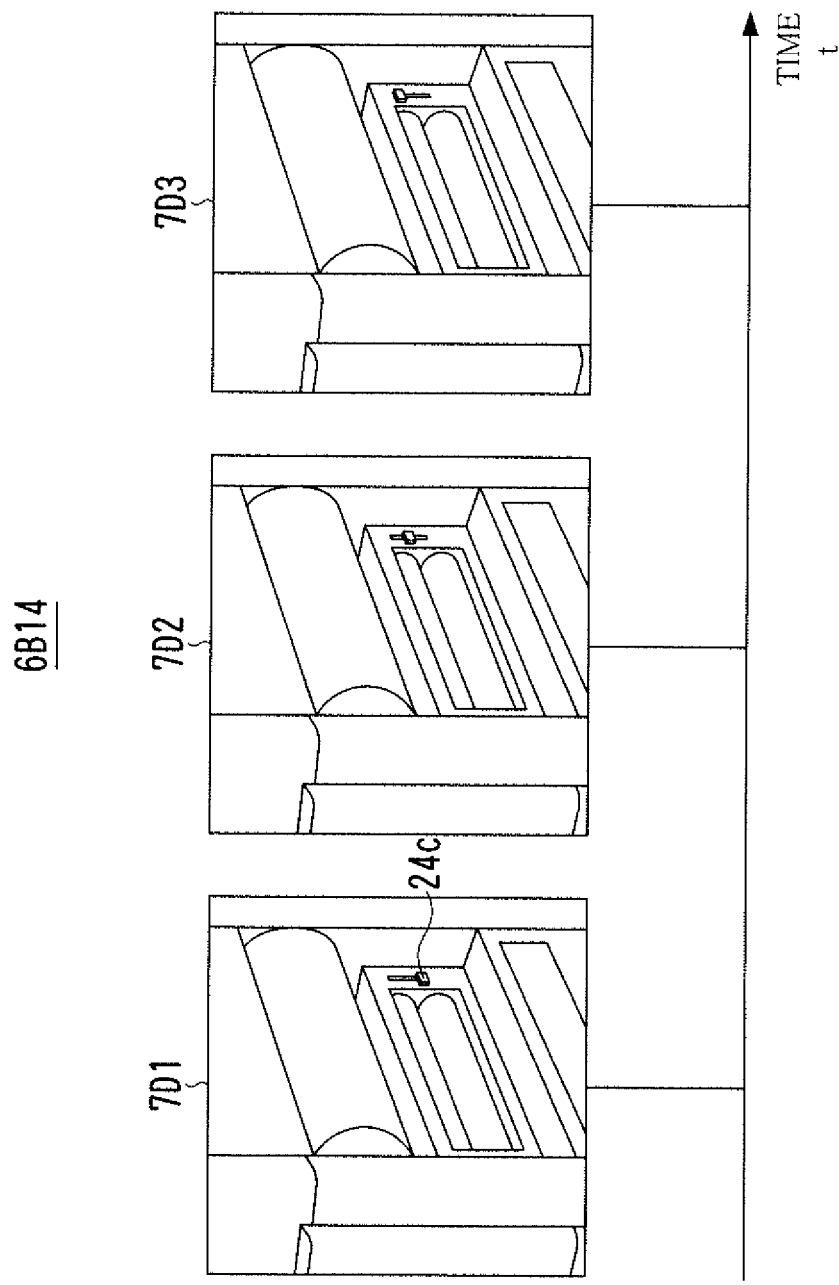
FIG. 9 is a diagram showing an example of images included in a moving image of a chapter.
Figure 10:
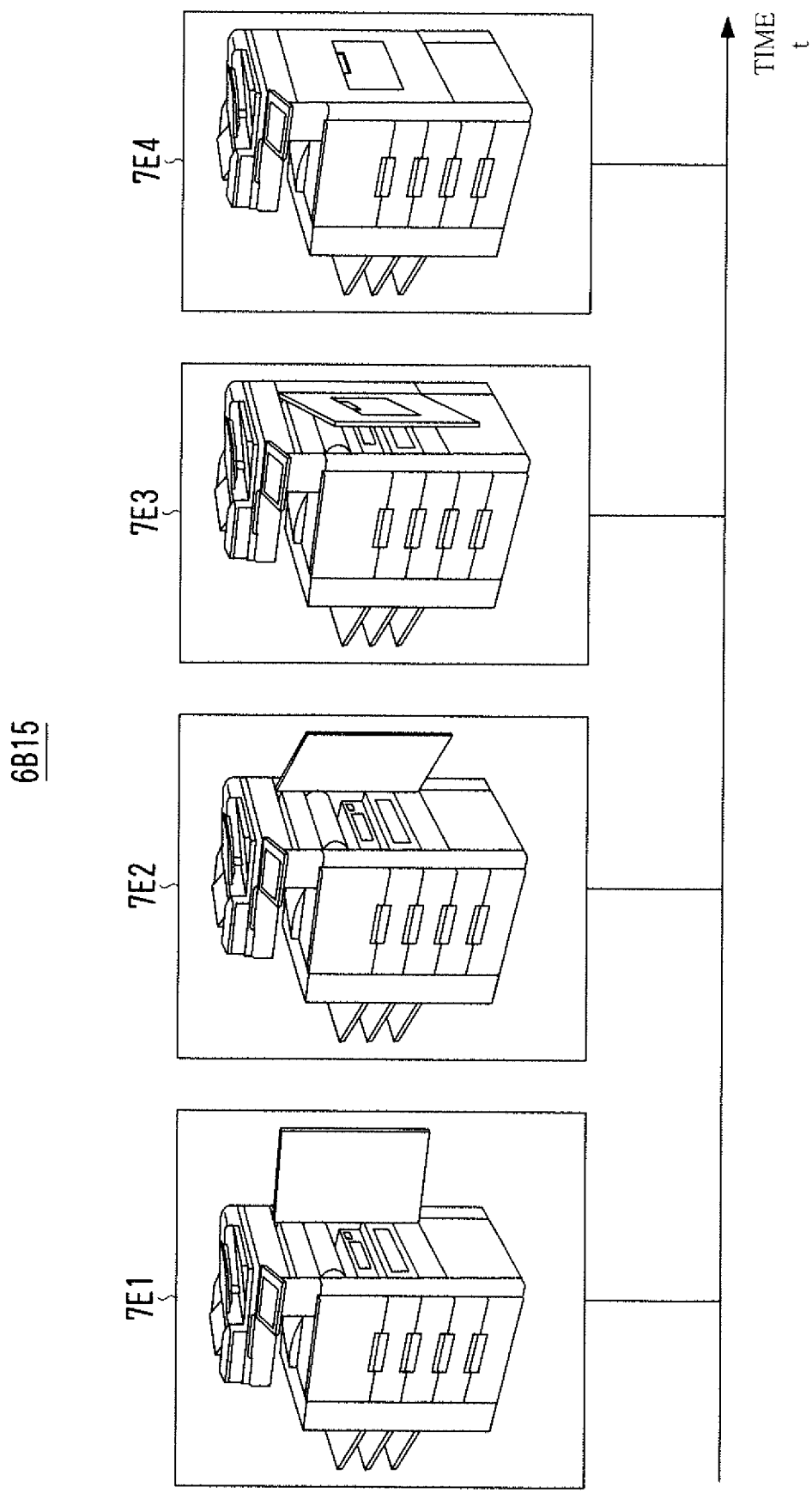
FIG. 10 is a diagram showing an example of images included in a moving image of a chapter.
Figure 11:
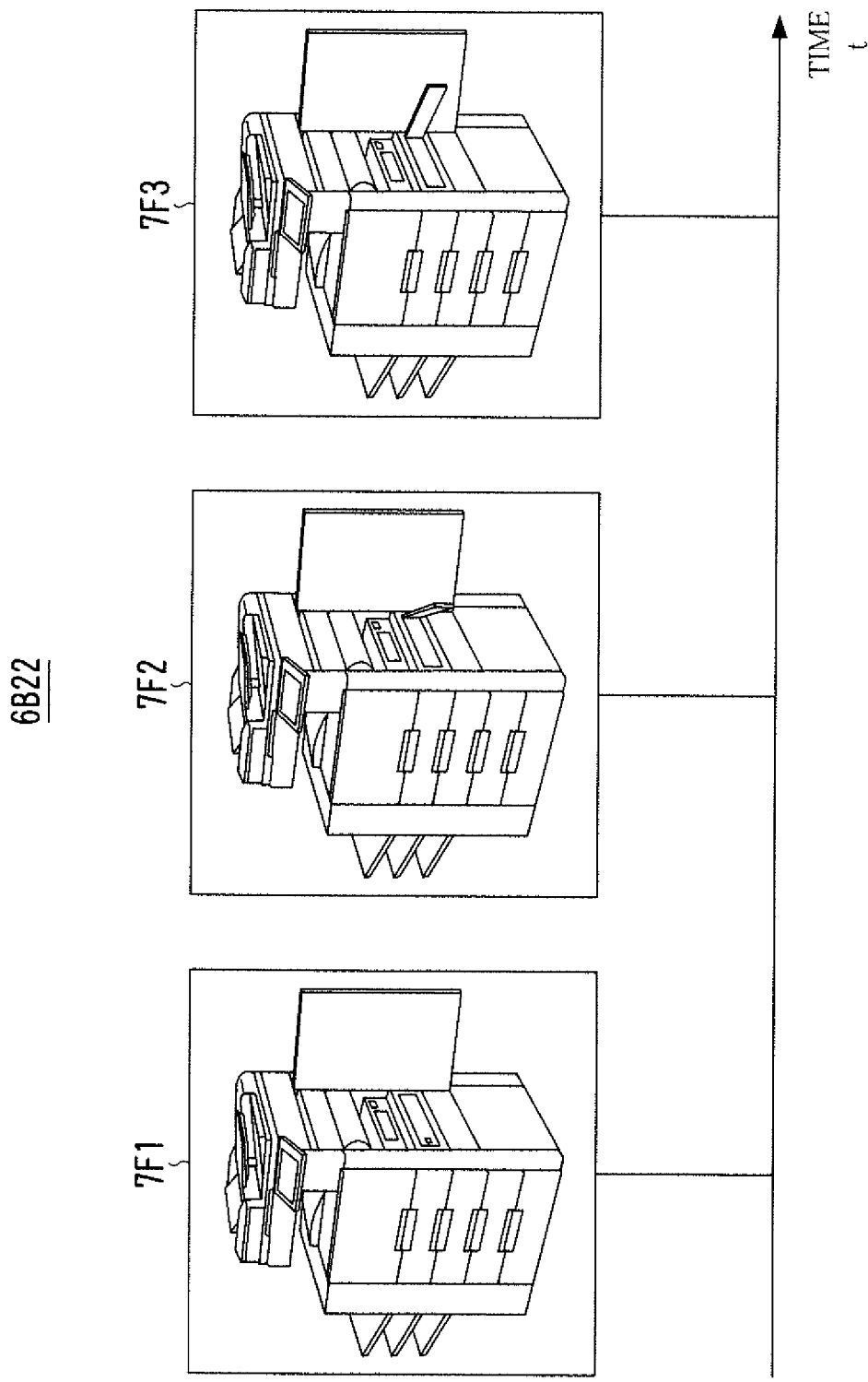
FIG. 11 is a diagram showing an example of images included in a moving image of a chapter.
Figure 12:
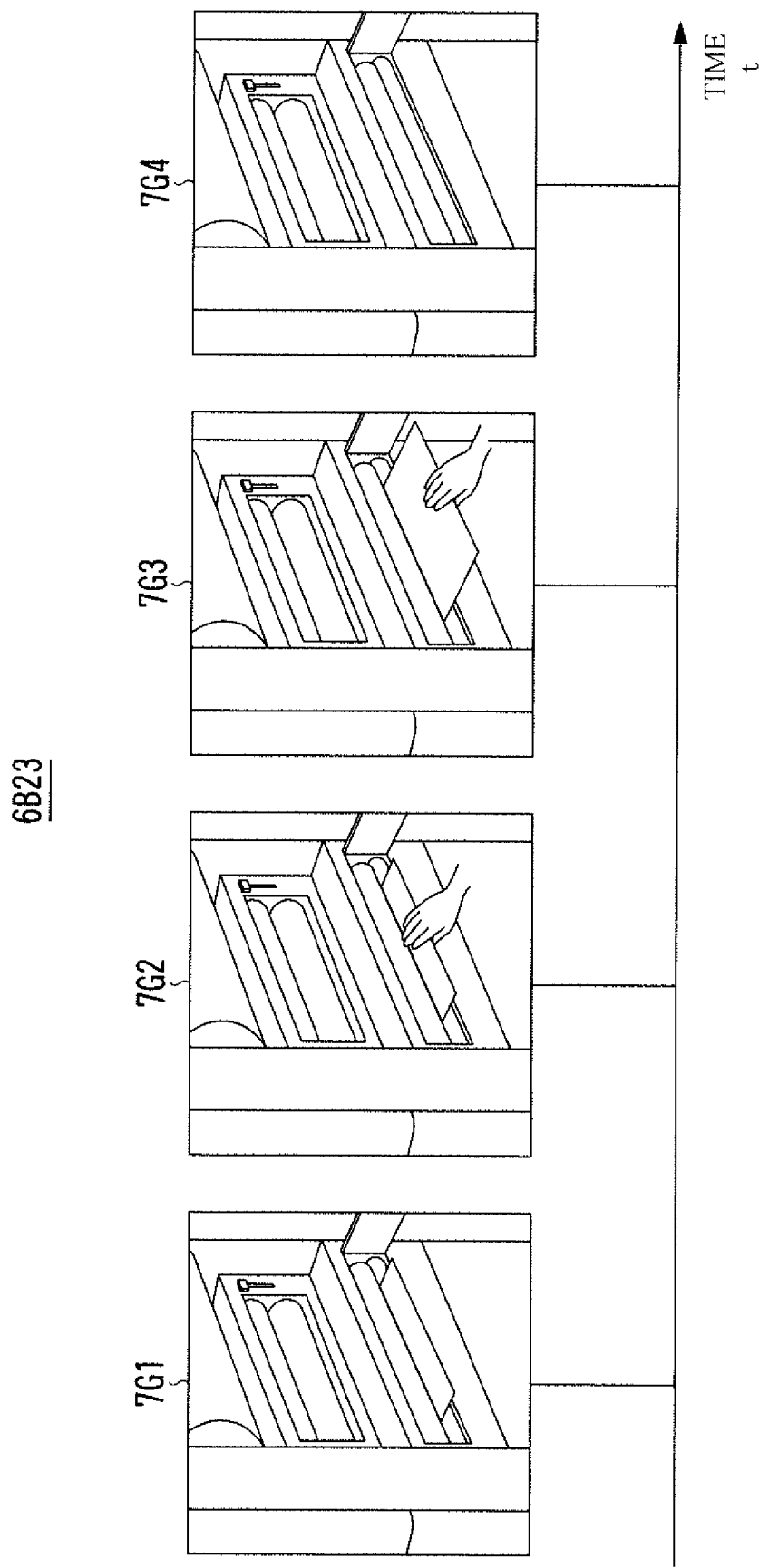
FIG. 12 is a diagram showing an example of images included in a moving image of a chapter.
Figure 13:
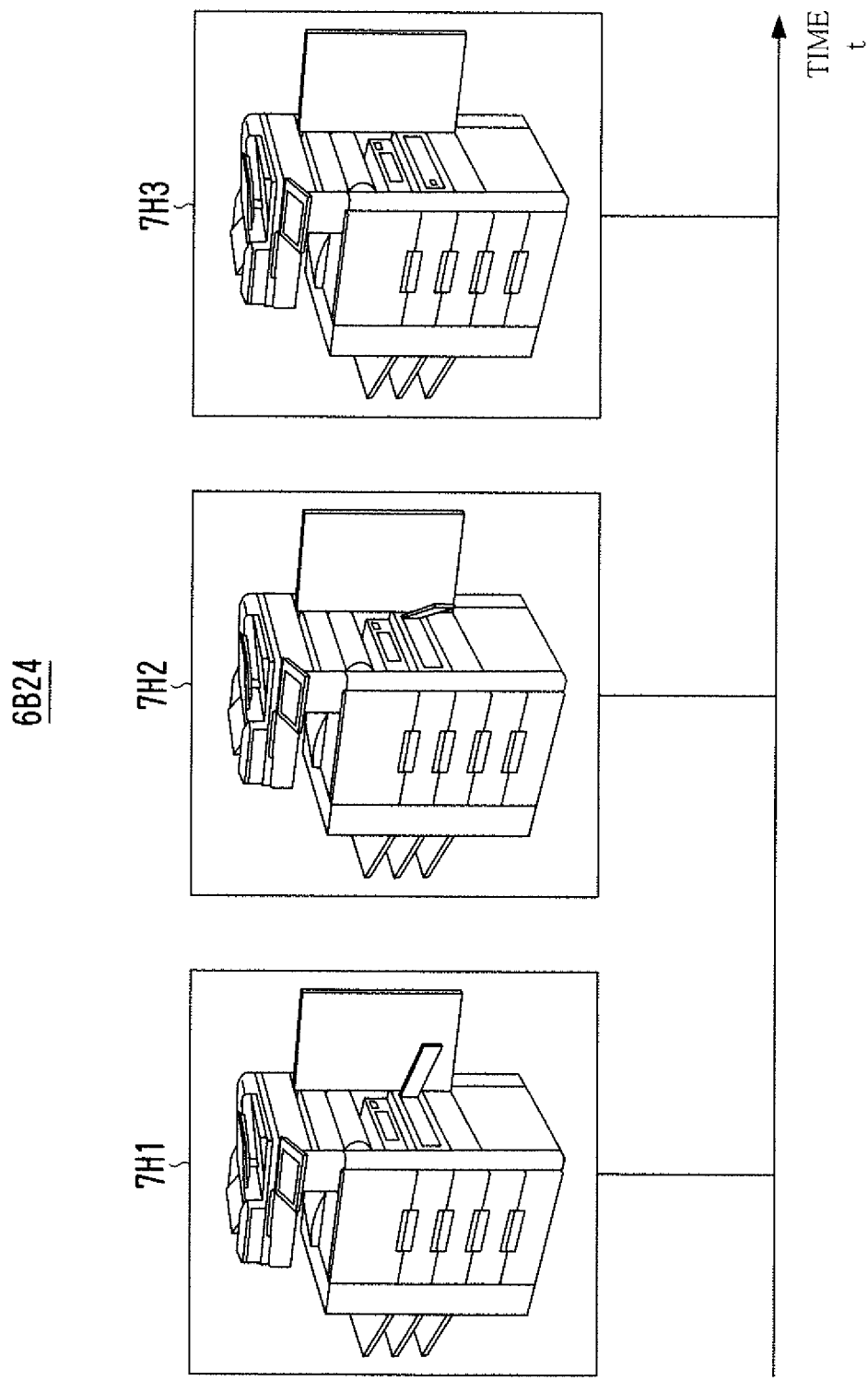
FIG. 13 is a diagram showing an example of images included in a moving image of a chapter.
Figure 15:
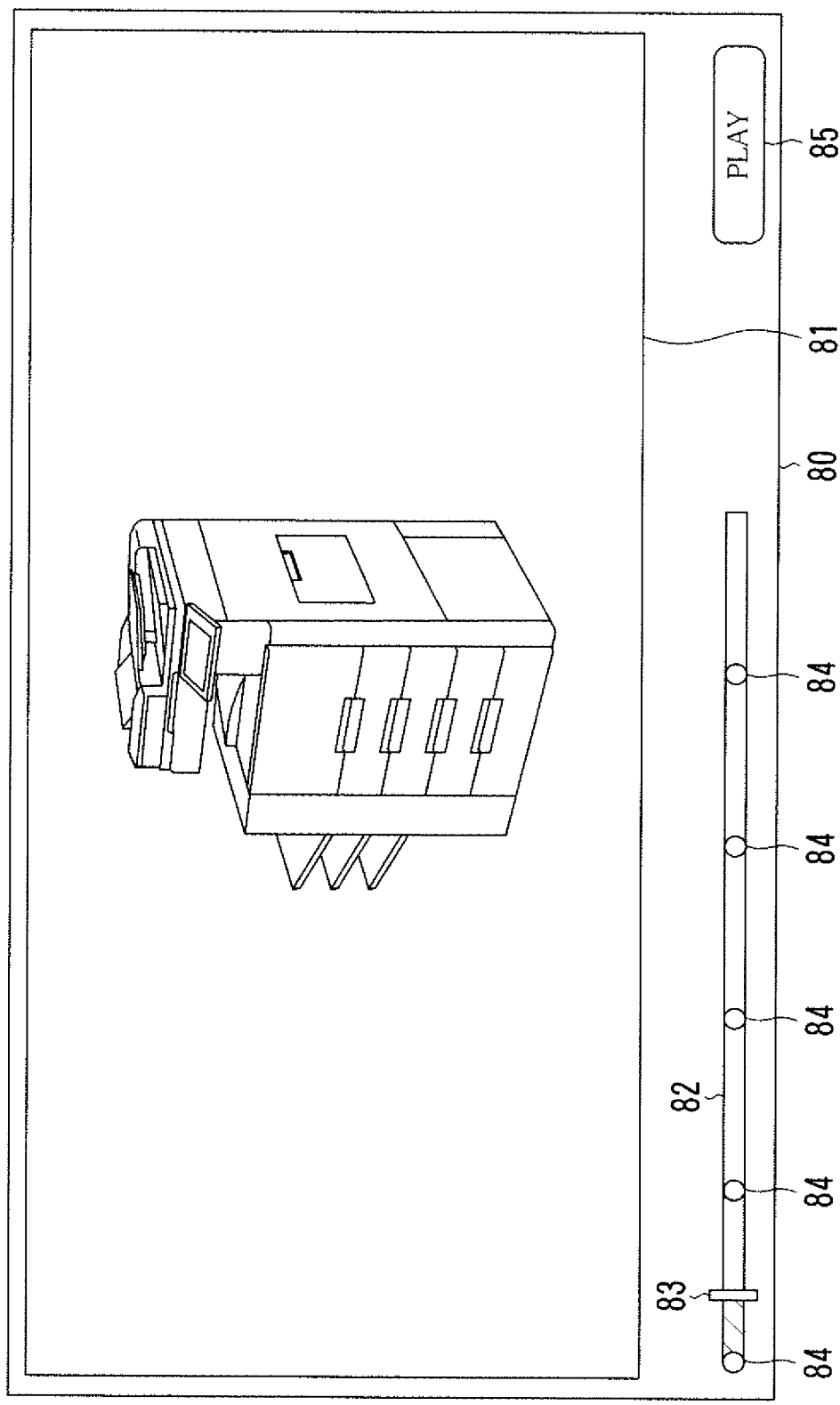
FIG. 15 is a diagram showing an example of a guidance screen.
Figure 16:
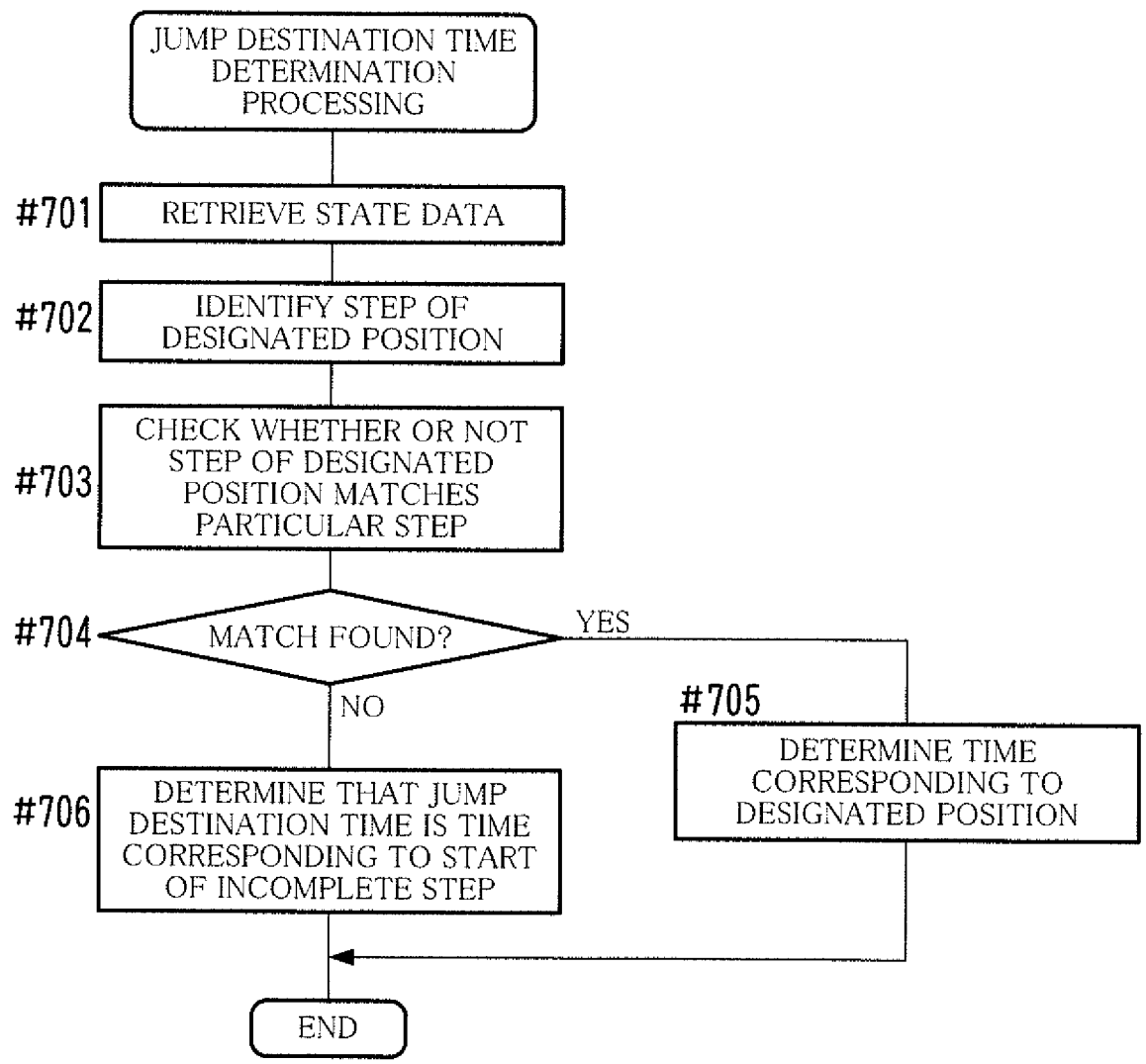
FIG. 16 is a flowchart depicting an example of the flow of jump destination time determination processing.
Figure 17:
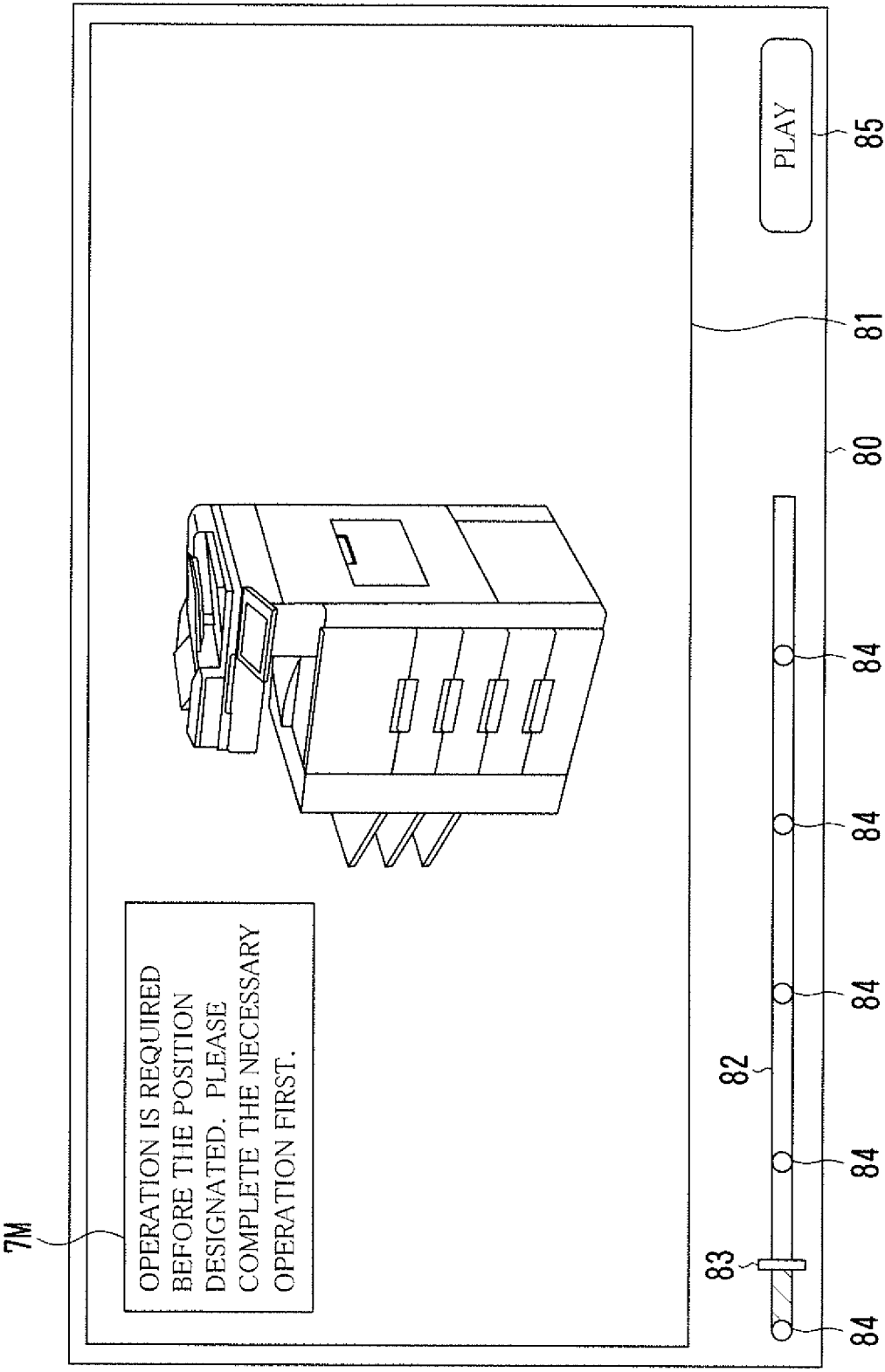
FIG. 17 is a diagram showing an example of a message.

FIG. 5 is a diagram showing an example of state change data 6A. FIG. 6 is a diagram showing an example of images 7A1-7A4 included in a moving image of a chapter. FIG. 7 is a diagram showing an example of images 7B1-7B3 included in a moving image of a chapter. FIG. 8 is a diagram showing an example of images 7C1-7C4 included in a moving image of a chapter. FIG. 9 is a diagram showing an example of images 7D1-7D3 included in a moving image of a chapter. FIG. 10 is a diagram showing an example of images 7E1-7E4 included in a moving image of a chapter. FIG. 11 is a diagram showing an example of images 7F1-7F3 included in a moving image of a chapter. FIG. 12 is a diagram showing an example of images 7G1-7G4 included in a moving image of a chapter. FIG. 13 is a diagram showing an example of images 7H1-7H3 included in a moving image of a chapter. FIGS. 14A and 14B are diagrams showing examples of state data 6C. FIG. 15 is a diagram showing an example of a guidance screen 80. FIG. 16 is a flowchart depicting an example of the flow of jump destination time determination processing. FIG. 17 is a diagram showing an example of a message 7M.

Meanwhile, in general, a user performs steps (processes, phases) according to a predetermined procedure, namely, in an orderly manner, so that the maintenance is performed completely.

In this embodiment, it is confirmed, based on the result of detection by any one of the sensors of the image forming apparatus 1, that one step is performed properly.

Referring to FIG. 5, the state change data storage portion 101 stores, in advance, the state change data 6A for each type of maintenance.

The state change data 6A shows, for each step, a change in state of the image forming apparatus 1 (state before the change thereof and state after the change thereof) for the case where the maintenance is performed in proper steps. The change in state is detected by any one of the sensors of the image forming apparatus 1. Hereinafter, the state change data 6A for each type of maintenance may be described separately as "state change data 6A1", "state change data 6A2", . . . , and so on.

For example, the state change data 6A1 is the state change data 6A on maintenance to "clear a paper jam in the fixing unit".

The state change data 6A1 shows, for each of five steps of the maintenance, a change in state for the case where the maintenance is performed properly and a sensor detecting the change in the following manner.

The change to be detected at first is to "change the state of the right door 27 from the closed state to the open state". The right door sensor 204 detects the change.

The change to be detected secondarily is to "change the state of the lever 24c from the "up" position to the "down" position". The lever sensor 205 detects the change.

The change to be detected thirdly is to "change the state of the fixing unit 24 from paper present to no paper present". The first paper path sensor 201 detects the change.

The change to be detected fourthly is to "change the state of the lever 24c from the "down" position to the "up" position". The lever sensor 205 detects the change.

The change to be detected at last is to "change the state of the right door 27 from the open state to the closed state". The right door sensor 204 detects the change.

The state change data 6A2 is the state change data 6A on maintenance to "clear a paper jam in the printed matter path".

The state change data 6A2 shows, for each of five steps of the maintenance, a change in state for the case where the maintenance is performed properly and a sensor detecting the change in the following manner.

The change to be detected at first is to "change the state of the right door 27 from the closed state to the open state" as with the case of clearing a paper jam in the fixing unit. The right door sensor 204 detects the change.

The change to be detected secondarily is to "change the state of the inner door 28 from the closed state to the open state". The inner door sensor 206 detects the change.

The change to be detected thirdly is to "change the state of the printed matter path 251 from paper present to no paper present". The second paper path sensor 202 detects the change.

The change to be detected fourthly is to "change the state of the inner door 28 from the open state to the closed state". The inner door sensor 206 detects the change.

The change to be detected at last is to "change the state of the right door 27 from the open state to the closed state" as with the case of clearing a paper jam in the fixing unit. The right door sensor 204 detects the change.

The change in state of the image forming apparatus 1 is made in response to a task made by the user, namely, in response to user operation on the image forming apparatus 1. It can be therefore said that the state change data 6A also shows the user's task necessary to perform the maintenance.

The state change data 6A also includes corresponding error 6AH. For example, the state change data 6A1 includes, as the corresponding error 6AH, a corresponding error 6AH1. The "corresponding error" is an error to be corrected by performing maintenance related to the state change data 6A. To be specific, for example, the corresponding error 6AH1 is an error of "paper jam in the fixing unit" and an error to which maintenance to "clear a paper jam in the fixing unit" is to be performed.

The reproduction data storage portion 102 stores, in advance, guidance data 6B for each piece of guidance. Stated differently, the reproduction data storage portion 102 stores, one by one, the guidance data 6B corresponding to the state change data 6A. Hereinafter, the guidance data 6B corresponding to the state change data 6A1, the state change data 6A2, . . . , and so on are sometimes described separately as "guidance data 6B1", "guidance data 6B2", . . . , and so on.

The guidance data 6B is data on a moving image and audio for explaining how to perform maintenance. The guidance data 6B includes step data for each step. The guidance includes chapters for each step of the maintenance.

For example, the guidance data 6B corresponding to the state change data 6A1, namely, the guidance data 6B1, includes five sets of step data 6B11-6B15 (see FIGS. 6-10). The step data 6B11-6B15 is data for reproducing moving images and audio of the first through fifth chapters, respectively.

The step data 6B11 is used to reproduce the moving image as shown in FIG. 6. To be specific, the moving image is so reproduced to show the transition from a state where the right door 27 is closed (image 7A1), to a state where the right door 27 is opened slightly (image 7A2), to a state where the right door 27 is opened by two thirds or so (image 7A3), and to a state where the right door 27 is opened completely (image 7A4).

The images 7A1-7A4 form one frame of the moving image. Likewise, the images 7B1-7B3, the images 7C1-7C4, the images 7D1-7D3, the images 7E1-7E4, the images 7F1-7F3, the images 7G1-7G4, and the images 7H1-7H3 form one frame each.

The step data 6B11 is used also to reproduce audio in line with the moving image. The same applies to the other step data described below.

The step data 6B12 is used to reproduce the moving image as shown in FIG. 7. To be specific, the moving image is so reproduced to show the transition from a state where the right door 27 is opened completely and the lever 24c is in the "up" position (image 7B1), to a state where the lever 24c is in the "middle" position (image 7B2), and to a state where the heat rollers 24a and 24b are separated away from each other and the lever 24c is in the completely "down" position (image 7B3).

The step data 6B13 is used to reproduce the moving image as shown in FIG. 8. To be specific, the moving image is so reproduced to show the transition from a state where the heat rollers 24a and 24b are separated away from each other and paper is jammed therebetween (image 7C1), to a state where the paper between the heat rollers 24a and 24b is pulled out slightly (image 7C2), to a state where the paper between the heat rollers 24a and 24b is pulled out fairly (image 7C3), and to a state where the paper is not jammed any more between the heat rollers 24a and 24b (image 7C4).

The step data 6B14 is used to reproduce the moving image as shown in FIG. 9. To be specific, the moving image is so reproduced to show the transition from a state where the heat rollers 24a and 24b are separated away from each other and the lever 24c is in the completely "down" position (image 7D1), to a state where the lever 24c is in the "middle" position (image 7D2), and to a state where the lever 24c is in the completely "up" position (image 7D3).

The step data 6B15 is used to reproduce the moving image as shown in FIG. 10. To be specific, the moving image is so reproduced to show the transition from a state where the right door 27 is opened completely (image 7E1), to a state where the right door 27 is closed slightly (image 7E2), to a state where the right door 27 is closed by two thirds or so (image 7E3), and to a state where the right door 27 is closed completely (image 7E4).

The guidance data 6B corresponding to the state change data 6A2, namely, the guidance data 6B2, includes five sets of step data 6B21-6B25.

The step data 6B21 is used to reproduce a moving image and audio in a manner similar to that in the step data 6B11 (see FIG. 6).

The step data 6B22 is used to reproduce the moving image as shown in FIG. 11. To be specific, the moving image is so reproduced to show the transition from a state where the right door 27 is opened completely and the inner door 28 is closed (image 7F1), to a state where the inner door 28 is opened by half or so (image 7F2), and to a state where the inner door 28 is opened completely (image 7F3).

The step data 6B23 is used to reproduce the moving image as shown in FIG. 12. To be specific, the moving image is so reproduced to show the transition from a state where paper is jammed in the printed matter path 251 (image 7G1), to a state where the paper is pulled out slightly (image 7G2), to a state where the paper is pulled out fairly (image 7G3), and to a state where the paper is removed from the printed matter path 251 (image 7G4).

The step data 6B24 is used to reproduce the moving image as shown in FIG. 13. To be specific, the moving image is so reproduced to show the transition from a state where the inner door 28 is opened completely (image 7H1), to a state where the inner door 28 is opened by half or so (image 7H2), and to a state where the inner door 28 is closed completely (image 7H3).

The step data 6B25 is used to reproduce a moving image and audio in a manner similar to that in the step data 6B15 (see FIG. 10).

In addition, the step data for each step indicates a time (position, point) of the start (top) of the moving image of that step in the guidance. Suppose, for example, that the moving images of the five steps of the guidance reproduced based on the guidance data 6B1 have lengths of "1 minute and 30 seconds", "45 seconds", "1 minute and 5 seconds", "25 seconds", and "35 seconds", respectively. In such a case, the step data 6B11-6B15 indicate, as the start time, a timestamp of "0 minute 0 second", "1 minute 30 seconds", "2 minutes 15 seconds", "3 minutes 20 seconds", and "3 minutes 45 seconds", respectively.

Referring to FIG. 14A, the state data storage portion 103 stores state data 6C for each set of state change data 6A. Hereinafter, the state data 6C for each set of state change data 6A1, state change data 6A2, . . . , and so on is sometimes distinguished from one another as "state data 6C1", "state data 6C2", . . . , and so on.

The state data 6C includes a complete flag 6D for each step of the maintenance. The complete flag 6D shows whether or not the step has been performed completely. If the complete flag 6D has a value of "1", then it means that the corresponding step has been performed completely. If the complete flag 6D has a value of "0", then it means that the corresponding step has not yet been performed completely. All the complete flags 6D have an initial value of "0 (zero)".

For example, the state data 6C1 has complete flags 6D11-6D15 as the complete flags 6D for the five steps to clear a paper jam in the fixing unit.

The state change detection portion 104 updates the complete flag 6D in accordance with the results of detection by the individual sensors. Which complete flag 6D is to be updated depending on which sensor detects what kind of change is defined in the state change data 6A.

For example, if the right door sensor 204 detects a change of the state of the right door 27 from the closed state to the open state, then the state change detection portion 104 updates the complete flag 6D11 from "0" to "1" as shown in FIG. 14B. If the lever sensor 205 detects a change of the state of the lever 24c from the "up" position to the "down" position, then the state change detection portion 104 updates the complete flag 6D12 from "0" to "1" as shown in FIG. 14B.

The guidance screen displaying portion 105 displays, in response to a predetermined command entered, the guidance screen 80 as shown in FIG. 15 in the touch-sensitive panel display 10e.

The guidance screen 80 has a moving image window 81, a progress bar 82, a cursor 83, chapter buttons 84, a play button 85, and so on.

In the moving image window 81, a moving image of guidance to be reproduced (hereinafter, referred to as "target guidance") and the like are displayed. The target guidance is designated by the user. Alternatively, the guidance screen displaying portion 105 may select, as the target guidance, guidance on how to perform maintenance to clear an error occurred based on the state change data 6A (see FIG. 5). For example, if a paper jam error occurs in the fixing unit 24, then guidance on maintenance to "clear a paper jam in the fixing unit" is preferably selected as the target guidance.

The progress bar 82 is to visualize how far the target guidance is played. The length L of the horizontal width of the progress bar 82 corresponds to the length of a time necessary to play the target guidance from the top to the end thereof at a normal speed (single speed). Such a time is hereinafter referred to as a "play duration T0". The left edge and the right edge of the progress bar 82 correspond to the top and the end of the target guidance, respectively. The progress bar 82 is sometimes called a "seekbar".

The cursor 83 is provided on the progress bar 82. The cursor 83 moves in line with the time at which the target guidance is currently played. The time is hereinafter referred to as a "current play time Pg". The cursor 83 is also to visualize how far the target guidance is played. Suppose, for example, that the play duration T0 is "3 minutes and 30 seconds" and the current play time Pg is "1 minute 10 seconds". In such a case, the cursor 83 is positioned on the right side, by L/3, from the left edge of the progress bar 82.

The chapter buttons 84 are provided on the progress bar 82 so that one chapter button 84 corresponds to one chapter. The chapter buttons 84 are provided at the positions corresponding to the start times of the individual chapters.

The progress bar 82 is displayed in a different format on the sides of the cursor 83. For example, the progress bar 82 is displayed in red color on the left side of the cursor 83, and displayed in white color on the right side thereof. Stated differently, the different format on the sides of the cursor visualizes how far the target guidance is played. As described above, the cursor 83 indicates the progress of how far the target guidance is played by using the location of the cursor 83 in the progress bar 82. The default position of the cursor 83 is on the left edge of the progress bar 82.

The user drags the cursor 83 to move the same to any position on the progress bar 82. Alternatively, the user taps any position on the progress bar 82 to move the cursor 83 to the tapped position. Alternatively, the user taps the chapter button 84 to move the cursor 83 to the position of the tapped chapter button 84. The user performs these operations to jump the playback progress to any point in time then to cause the target guidance to be played from the point in time.

However, where a beginner mode is set as the play mode, the cursor 83 sometimes moves to a position different from the position the user has dragged or tapped. This will be described later.

The play button 85 is a button for the user to give a command to start playing the target guidance.

The jump destination time determination portion 106 determines, in response to operation made on the progress bar 82, the cursor 83, or the chapter button 84, to which point in time of the target guidance the playback progress is to be jumped. Hereinafter, the time corresponding to the jump destination is referred to as "jump destination time Ps".

In the meantime, the image forming apparatus 1 has two play modes: a normal mode; and the beginner mode. The two modes are different in a way of jumping the playback progress in response to the progress bar 82, the cursor 83, or the chapter button 84 operated. The user can arbitrarily select which of the play modes is to be used.

In the normal mode, the jump destination time determination portion 106 moves the cursor 83 just as the user drags or taps the cursor 83 as per the conventional manner. To be specific, the jump destination time determination portion 106 moves the cursor 83 to a position designated through the progress bar 82, the cursor 83, or the chapter button 84. The position designated is hereinafter referred to as a "designated position". The jump destination time determination portion 106 then determines that the jump destination time Ps is a time corresponding to the designated position.

Suppose, for example, that the play duration T0 is "3 minutes and 30 seconds" and the designated position is a position which is L/6 rightward away from the left edge of the progress bar 82. In such a case, the jump destination time determination portion 106 determines that the jump destination time Ps is "0 minutes 35 seconds".

In contrast, in the beginner mode, the jump destination time determination portion 106 determines the jump destination time Ps according to the steps depicted in FIG. 16.

The jump destination time determination portion 106 retrieves the sets of state data 6C on the target guidance from the state data storage portion 103 (Step #701 of FIG. 16), and identifies a step of the time corresponding to the designated position (Step #702). The time can be identified based on the start time indicated in each set of step data of the guidance data 6B of the target guidance.

The jump destination time determination portion 106 checks whether or not the step identified matches a step to be currently performed by the user (Step #703). The latter step is hereinafter referred to as a "particular step". The particular step can be determined based on the sets of state data 6C of the target guidance. To be specific, the complete flags 6D indicating "0" are searched from among the sets of state data 6C retrieved. The jump destination time determination portion 106 determines that a step related to a complete flag 6D which is closest to the top as compared with the other complete flags 6D indicating "0" is the particular step.

If the identified step matches the particular step (YES in Step #704), then the jump destination time determination portion 106 determines that the jump destination time Ps is time corresponding to the designated position as with the case of the normal mode (Step #705). The jump destination time determination portion 106 further moves the cursor 83 to the designated position. The jump destination time determination portion 106 may determine that the jump destination time Ps is time corresponding to the top of the step including the time corresponding to the designated position.

On the other hand, unless the identified step matches the particular step (NO in Step #704), then the jump destination time determination portion 106 determines that the jump destination time Ps is time corresponding to the start (the first frame) of the particular step (Step #706). Stated differently, the jump destination time determination portion 106 determines that the jump destination time Ps is time corresponding to the start of the first step of the steps having not yet been performed completely. The determination is made irrespective of the time corresponding to the designated position.

Suppose, for example, that the target guidance is guidance to clear a paper jam in the fixing unit, and that the complete flags 6D of the state data 6C on the maintenance indicate the values as shown in FIG. 14B. In such a case, the jump destination time determination portion 106 determines that the jump destination time Ps is time corresponding to the start time of the third step, namely, "1 minute 30 seconds".

Referring back to FIG. 4, the moving image reproducing portion 107 displays a moving image of target guidance in the moving image window 81 of the guidance screen 80 based on the guidance data 6B on the target guidance. In short, the moving image reproducing portion 107 reproduces the moving image of the target guidance.

To be specific, the moving image reproducing portion 107 reproduces the moving image as discussed below in accordance with operation by the user or the result of processing by the jump destination time determination portion 106.

When the user taps on the play button 85, the moving image reproducing portion 107 reads out the guidance data 6B on the target guidance from the reproduction data storage portion 102, and starts playing the target guidance from time corresponding to the current location of the cursor 83. When the user has not yet operated the progress bar 82 or the cursor 83, the moving image reproducing portion 107 starts playing the target guidance from the top of the first step, namely, from "0 minute 0 second" because the default location of the cursor 83 is on the left edge of the progress bar 82.

When the user operates the progress bar 82 or the cursor 83 with the target guidance played, the jump destination time determination portion 106 determines jump destination time Ps as discussed above. In response to the determination, the moving image reproducing portion 107 jumps the playback progress to the jump destination time Ps and then continues to play the moving image from the jump destination time Ps.

Suppose, for example, that the jump destination time Ps is determined to be "3 minutes 25 seconds" while the moving image corresponding to the time "3 minutes 5 seconds" is played. In such a case, the moving image reproducing portion 107 skips the playback progress to the position of "3 minutes 25 seconds" and then plays the moving image from the position. In another example, if the jump destination time Ps is determined to be "2 minutes 15 seconds" while the moving image corresponding to the time "3 minutes 5 seconds" is played, then the moving image reproducing portion 107 puts the playback progress back to the position of "2 minutes 15 seconds" and then plays the moving image from the position.

The audio reproducing portion 108 controls, based on the guidance data 6B on the target guidance, the audio unit 10k in such a manner that audio is outputted in line with the display of the moving image by the moving image reproducing portion 107.

If the jump destination time Ps is determined to be time different from the time corresponding to the designated position, then the message displaying portion 109 displays the message 7M, as shown in FIG. 17, in the moving image window 81. The message 7M says that as essential steps (processing) have not yet been performed, the playback progress is jumped to that incomplete section.

The message displaying portion 109 may display the message 7M together with the moving image. Alternatively, when a predetermined amount of time has elapsed or the user performs predetermined operation after the message 7M was displayed, the moving image reproducing portion 107 may reproduce the moving image.

Figure 18:
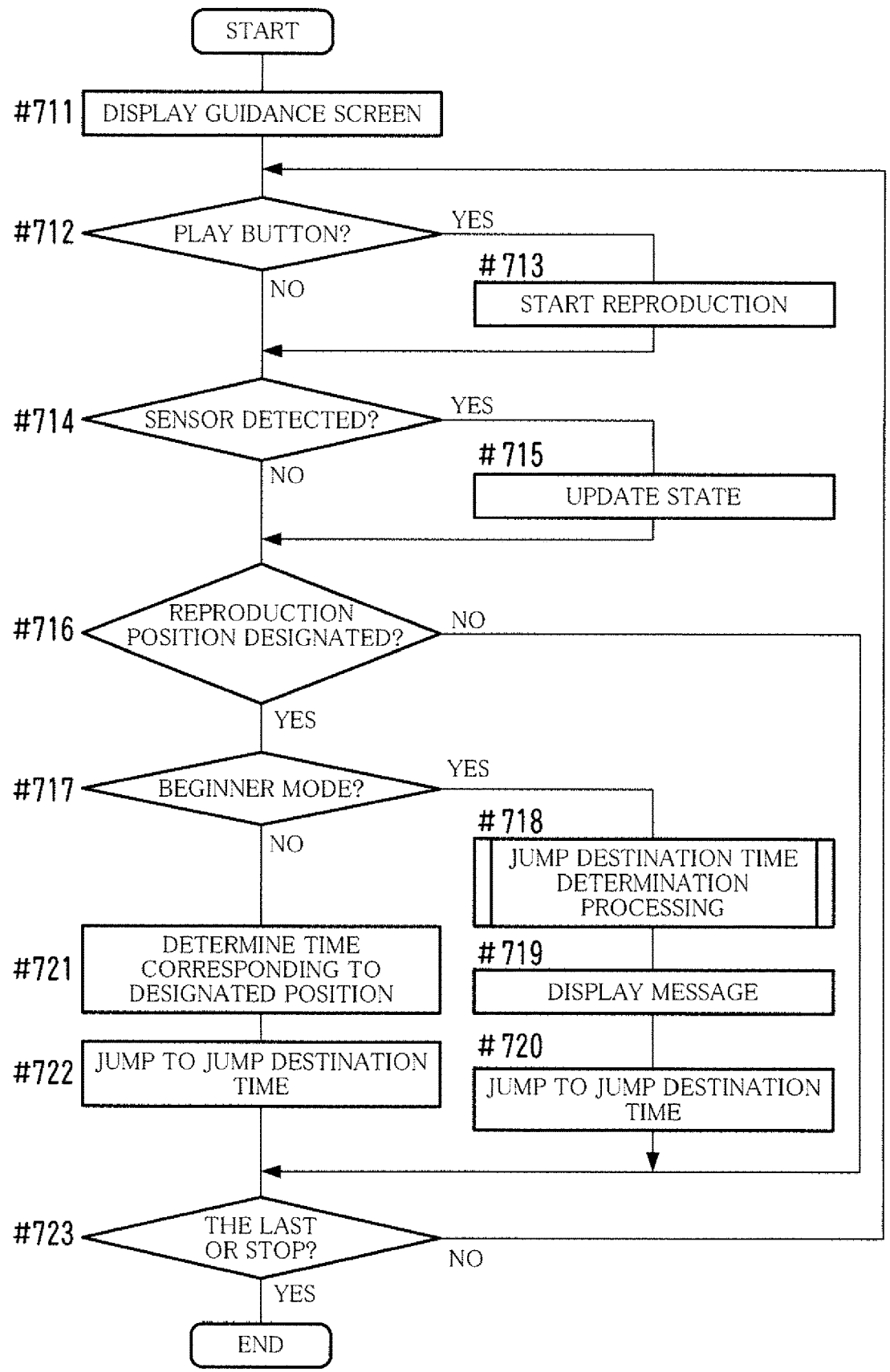
FIG. 18 is a flowchart depicting an example of the flow of the entire processing for displaying guidance in an image forming apparatus.

FIG. 18 is a flowchart depicting an example of the flow of the entire processing for displaying guidance in the image forming apparatus 1.

The description goes on to the flow of the processing for displaying guidance by the image forming apparatus 1.

The image forming apparatus 1 performs the processing based on the guidance reproducing program 10P in accordance with the steps shown in FIG. 18.

The image forming apparatus 1 displays the guidance screen 80 (see FIG. 15) (Step #711). In response to the play button 85 tapped (YES in Step #712), the image forming apparatus 1 reproduces the moving image and audio of the target guidance from time corresponding to the current location of the cursor 83 (Step #713).

If any one of the sensors detects a change in state (YES in Step #714), then the image forming apparatus 1 updates the value of any of the complete flags 6D (see FIGS. 14A and 14B) of the state data 6C of the target guidance with "1" in accordance with the change detected (Step #715).

If the progress bar 82, the cursor 83, or the chapter button 84 is operated (YES in Step #716) with the image forming apparatus 1 set at the beginner mode as the play mode (YES in Step #717), then the image forming apparatus 1 determines the jump destination time Ps in the manner as depicted in FIG. 16 (Step #718). The image forming apparatus 1 displays the message 7M (see FIG. 17) (Step #719), and further jumps the playback progress to the jump destination time Ps (Step #720). At this time, the image forming apparatus 1 moves the cursor 83 to a position corresponding to the jump destination time Ps. If the target guidance is being played at this time, the image forming apparatus 1 skips the playback progress or puts it back to the jump destination time Ps and then continues to play the moving image from the jump destination time Ps.

On the other hand, if the normal mode is set as the play mode (No in Step #717), then the image forming apparatus 1 moves the cursor 83 just as the user performs operation to determine the jump destination time Ps to be a position of the destination (designated position) (Step #721). Then, the image forming apparatus 1 jumps the playback progress to the jump destination time Ps (Step #722). If the target guidance is being played at this time (No in Step #723), then the image forming apparatus 1 skips the playback progress or puts it back to the jump destination time Ps and then continues to play the moving image from the jump destination time Ps.

The image forming apparatus 1 appropriately performs the processing of Step #713, the processing of Step #715, the processing of Steps #718-#720, and the processing of Steps #721-#722 until a stop command is entered or until the moving image is played to the end.

According to the foregoing processing, when the beginner mode is set, the guidance is reproduced, for example, in the following manner.

When a printed matter is jammed in the printed matter path 251, the image forming apparatus 1 plays, as the target guidance, guidance to "clear a jam of a printed matter". The moving image of the guidance includes the images shown in FIGS. 6, 11, 12, 13, and 10.

While the moving image is played, the user operates the progress bar 82, the cursor 83, or the chapter button 84, with the right door 27 opened and the inner door 28 not yet opened, to skip the playback progress or put it back to the step of removing the printed matter. In this state, however, the printed matter cannot be seen.

To address this, the image forming apparatus 1 jumps the playback progress to the first step of the incomplete section, independently of the user operation, namely, to the top of a chapter of a step for opening the inner door 28 and then plays the moving image from the top of the chapter.

As another example, when a paper jam occurs in the fixing unit 24, the image forming apparatus 1 plays, as the target guidance, the guidance to "clear a paper jam in the fixing unit". The moving image of the guidance includes the images shown in FIGS. 6-10.

While the moving image is played, the user operates the progress bar 82, the cursor 83, or the chapter button 84, with the right door 27 opened and the lever 24*c* not yet been moved down, to skip the playback progress or put it back to the step of removing the printed matter. However, when the user attempts to remove the paper in this state, the paper is probably torn. This makes it difficult to clear the error or leads to malfunction of the heat rollers 24*a* and 24*b*.

To address this, the image forming apparatus 1 jumps the playback progress to the first step of the incomplete section, independently of the user operation, namely, to the top of a chapter of a step for moving the lever 24*c* down and then plays the moving image from the top of the chapter.

According to this embodiment, the user can operate the image forming apparatus 1 to jump the playback progress to a position of a step (processing) which has not yet been performed and to play the guidance from the position of the step more easily than is conventionally possible.

If jumping the playback progress to the top of the particular step in the guidance because the identified step and the particular step do not match each other, the moving image reproducing portion 107 and the audio reproducing portion 108 may change the speed for playing the guidance to be slower than the normal speed. For example, the speed may be decreased to be approximately 0.5-0.9 times as fast as the normal speed.

Alternatively, in such a case, the moving image reproducing portion 107 and the audio reproducing portion 108 may play the chapter repeatedly until the step related to the chapter of the jump destination is performed completely.

The audio reproducing portion 108 may prepare a flag indicating whether or not to output audio. In such a case, if the flag is ON, then the audio reproducing portion 108 controls the audio unit 10*k* to output audio. If the flag is OFF, then the audio reproducing portion 108 controls the audio unit 10*k* to output no audio. However, if jumping the playback progress to the top of the particular step of the guidance because the identified step and the particular step do not match each other, the audio reproducing portion 108 may output audio forcedly even if the flag is OFF.

Figure 19:
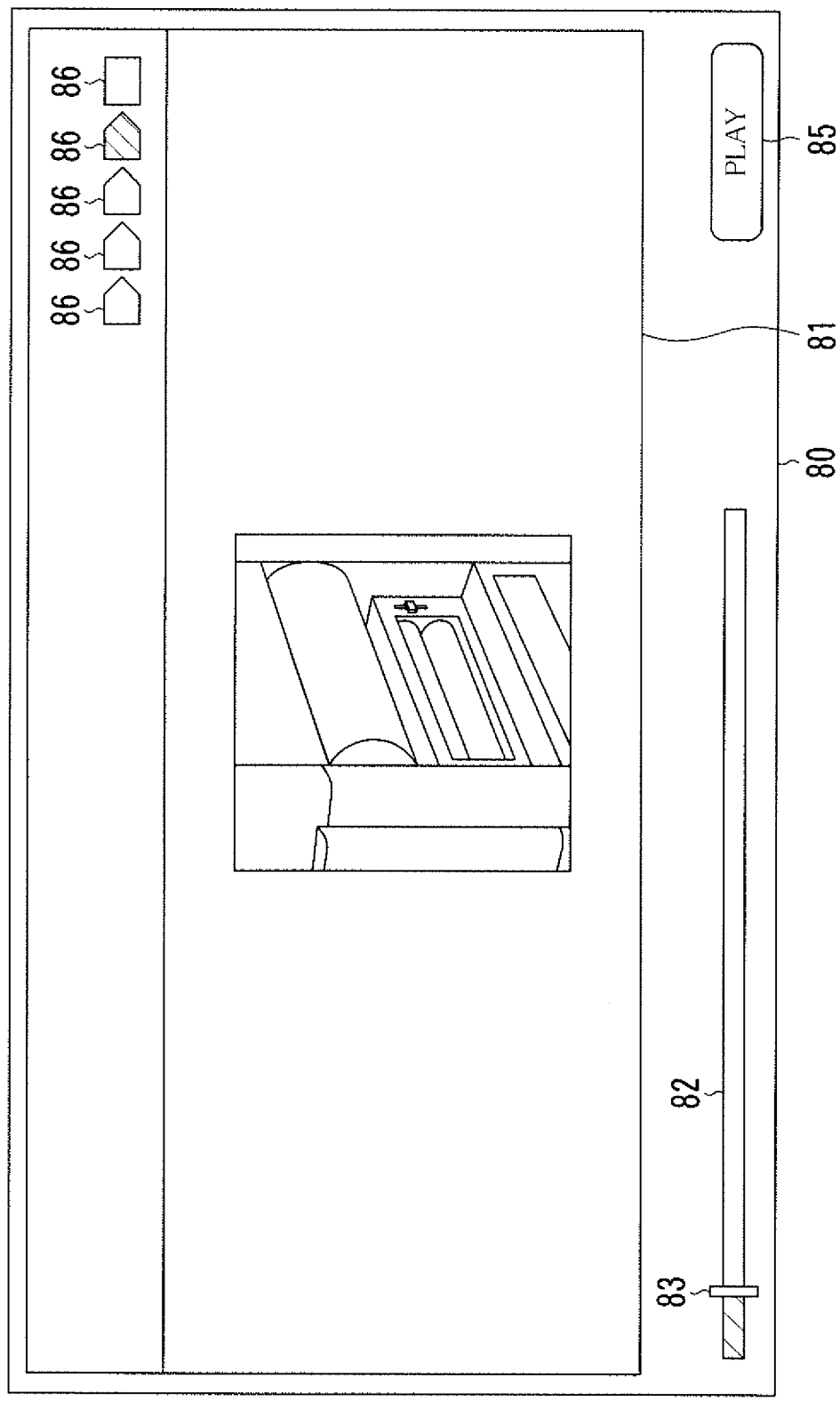
FIG. 19 is a diagram showing a modified example of a guidance screen.

FIG. 19 is a diagram showing a modified example of the guidance screen 80. In this embodiment, the chapter buttons 84 are provided on the progress bar 82. Instead of this, however, the chapter button may be provided in a different location from the progress bar 82. Such an example is shown as chapter buttons 86 of FIG. 19.

In this embodiment, the user uses the progress bar 82, the cursor 83, or the chapter button 84 (see FIG. 15) to designate a jump destination of the target guidance. Instead of this, however, the user may use another method for such designation. For example, the user may use numeric keys to enter time to be designated as the jump destination.

In this embodiment, the image forming apparatus 1 reproduces guidance. Instead of this, a terminal capable of performing communication with the image forming apparatus 1, for example, a smartphone or a tablet computer, may reproduce guidance.

In such a case, such a terminal preferably downloads, from the image forming apparatus 1, the data stored in the state change data storage portion 101, the reproduction data storage portion 102, or the state data storage portion 103. The terminal preferably receives, from the image forming apparatus 1, a result of detection by the sensors. The terminal is preferably provided with the state change detection portion 104, the guidance screen displaying portion 105, the jump destination time determination portion 106, the moving image reproducing portion 107, the audio reproducing portion 108, and the message displaying portion 109. Instead of the touch-sensitive panel display 10e and the audio unit 10k, a touch-sensitive panel display and an audio unit of the terminal are preferably used.

It is to be understood that the configuration of the image forming apparatus 1, the constituent elements thereof, the content of the processing, the order of the processing, the structure of the data, the structure of the screen, and the like may be appropriately modified without departing from the spirit of the present invention.

Although embodiments of the present invention have been described and illustrated in detail, it is clearly understood that the same is by way of illustration and example only and not limitation, the scope of the present invention should be interpreted by terms of the appended claims.

What is claimed is:

1. A device for reproducing guidance on a task including a plurality of steps, the device comprising:
    an input device with which a user selects a time position of the guidance is to be reproduced; and
    a player configured to: play guidance comprising a plurality of sequential steps for performing the task; for each step in the guidance to proceed to the next sequential step, receive a state change determination, based on a sensor reading indicating whether a maintenance operation corresponding to a step in the guidance has been performed completely by the user;
    received, from the input device, information indicative of a designated step corresponding to the selected time position by the user and its associated step of the guidance from among the steps;
    based on the state change determination, determine a particular step corresponding to a first step in the plurality of sequential steps that has not yet been performed completely, and is required to be completed before any remaining steps in the guidance can be performed;
    determine whether the selected time position of the designated step is within the particular step of the guidance;
    when the selected time position of the designated step is within the particular step, jump a playback progress to the selected time position to play the guidance, and when the selected time position of the designated step is not within the particular step, jump the playback progress to a start position of the particular step to play the guidance.

2. The device according to claim 1, wherein the player plays the guidance from a top of the particular step.

3. The device according to claim 1, wherein the player plays the guidance from a top of the designated step.

4. The device according to claim 1, comprising an output device configured to, where the designated step is not the particular step, output a message indicating that the playback progress is jumped to the particular step because an essential step has not yet been performed.

5. The device according to claim 1, wherein
    the player plays a moving image as the guidance, and
    where a predetermined flag is turned ON, or, alternatively, where the designated step is not the particular step, the player plays audio as the guidance.

6. The device according to claim 1, wherein, where the designated step is not the particular step, the player plays the guidance at a speed slower than a normal speed.

7. The device according to claim 1, wherein, where the designated step is not the particular step, the player jumps the playback progress to the position of the particular step and plays a part of the particular step of the guidance repeatedly until the particular step is performed completely.

8. The device according to claim 1, comprising
    a printing unit configured to perform printing,
    a tray for loading paper therein,
    a pair of rollers configured to convey the paper from the tray to the printing unit,
    a first door configured to cover the pair of rollers,
    a paper path on which to convey a printed matter, and
    a second door configured to cover the paper path, wherein the guidance is
        first guidance on how to clear an error of paper jam in the pair of rollers,
        second guidance on how to clear an error of paper jam in the paper path,
        third guidance on how to replace consumables used for the printing, or
        fourth guidance on how to add the paper to the tray.

9. The device according to claim 8, wherein
    the guidance is the first guidance, and
    the steps include, in this order, a first step of opening the first door, a second step of separating the pair of rollers from each other, a third step of removing paper from the pair of rollers, a fourth step of pressing the pair of rollers onto each other, and a fifth step of closing the first door.

10. The device according to claim 8, wherein
    the guidance is the second guidance, and
    the steps include, in this order, a first step of opening the first door, a second step of opening the second door, a third step of removing the printed matter from the paper path, a fourth step of closing the second door, and a fifth step of closing the first door.

11. A method for reproducing guidance on a task including a plurality of steps, the method comprising:
    performing designation processing for causing a user to select from which time position of the guidance is to be reproduced, wherein the guidance comprises a plurality of sequential steps for performing the task;
    for each step in the guidance to proceed to the next sequential step, determining a state change, based on a sensor reading indicating whether a maintenance operation corresponding to a current step in the guidance has been performed completely by the user;
    based on the state change determination, determining a particular step corresponding to a first step in the plurality of sequential steps that has not yet been performed completely, and is required to be completed before any remaining steps in the guidance can be performed;
    determining whether the selected time position of a designated step is within the particular step of the guidance;
    playing the guidance, when the selected time position of the designated step is within the particular step, by jumping a playback progress to the selected time position;
    and playing the guidance, when the selected time position of the designated step is not within the particular step, by jumping the playback progress to a start position of the particular step.

12. A non-transitory recording medium for storing a computer readable program used in a computer, the computer reproducing guidance on a task including a plurality of steps, the computer readable program controlling the computer to execute processing comprising: designation processing for causing a user to select from which time position of the guidance is to be reproduced, wherein the guidance comprises a plurality of sequential steps for performing the task;
- for each step in the guidance to proceed to the next sequential step, determining a state change, based on a sensor reading indicating whether a maintenance operation corresponding to a current step in the guidance has been performed completely by a user;
- based on the state change determination, determining a particular step corresponding to a first step in the plurality of sequential steps that has not yet been performed completely, and is required to be completed before any remaining steps in the guidance can be performed; determining whether the selected time position of a designated step is within the particular step of the guidance; and
- reproduction processing for playing the guidance,
- when the selected time position of the designated step within the particular step, by jumping a playback progress to the selected time position; and
- when the selected time position of the designated step is not within the particular step, by jumping the playback progress to a start position of the particular step.

13. The non-transitory recording medium according to claim 12, wherein the reproduction processing is processing for playing the guidance from a top of the particular step.

14. The non-transitory recording medium according to claim 12, wherein the reproduction processing is processing for playing the guidance from a top of the designated step.

15. The non-transitory recording medium according to claim 12, wherein the computer readable program controls the computer to perform output processing for, where the designated step is not the particular step, outputting a message indicating that the playback progress is jumped to the particular step because an essential step has not yet been performed.

16. The non-transitory recording medium according to claim 12, wherein the reproduction processing is processing for playing a moving image as the guidance, and where a predetermined flag is turned ON, or, alternatively, where the designated step is not the particular step, the reproduction processing is processing for playing audio as the guidance.

17. The non-transitory recording medium according to claim 12, wherein, where the designated step is not the particular step, the reproduction processing is processing for playing the guidance at a speed slower than a normal speed.

18. The non-transitory recording medium according to claim 12, wherein, where the designated step is not the particular step, the reproduction processing is processing for jumping the playback progress to the position of the particular step and playing a part of the particular step of the guidance repeatedly until the particular step is performed completely.

19. The non-transitory recording medium according to claim 12, wherein
- the guidance is to explain, as the task, a task to be performed on an image forming apparatus including a printing unit configured to perform printing, a tray for loading paper therein, a pair of rollers configured to convey the paper from the tray to the printing unit, a first door configured to cover the pair of rollers, a paper path on which to convey a printed matter, and a second door configured to cover the paper path, and
- the guidance is
    - first guidance on how to clear an error of paper jam in the pair of rollers,
    - second guidance on how to clear an error of paper jam in the paper path,
    - third guidance on how to replace consumables used for the printing, or
    - fourth guidance on how to add the paper to the tray.

20. The non-transitory recording medium according to claim 19, wherein
- the guidance is the first guidance, and
- the steps include, in this order, a first step of opening the first door, a second step of separating the pair of rollers from each other, a third step of removing paper from the pair of rollers, a fourth step of pressing the pair of rollers onto each other, and a fifth step of closing the first door.

21. The non-transitory recording medium according to claim 19, wherein
- the guidance is the second guidance, and
- the steps include, in this order, a first step of opening the first door, a second step of opening the second door, a third step of removing the printed matter from the paper path, a fourth step of closing the second door, and a fifth step of closing the first door.

* * * * *